(12) United States Patent
Oshikubo et al.

(10) Patent No.: US 7,720,180 B2
(45) Date of Patent: May 18, 2010

(54) TRACKING ERROR DETECTION AND CORRECTION METHODS AND APPARATUS

(75) Inventors: Hiromichi Oshikubo, Ibaraki (JP); Shoji Kobayashi, Kanagawa (JP); Osamu Hosokawa, Tokyo (JP)

(73) Assignee: Texas Instruments Incorporated, Dallas, TX (US)

( * ) Notice: Subject to any disclaimer, the term of this patent is extended or adjusted under 35 U.S.C. 154(b) by 918 days.

(21) Appl. No.: 11/375,985

(22) Filed: Mar. 15, 2006

(65) Prior Publication Data

US 2006/0209991 A1 Sep. 21, 2006

(30) Foreign Application Priority Data

Mar. 16, 2005 (JP) .............................. 2005-074679

(51) Int. Cl.
*H03D 3/22* (2006.01)
(52) U.S. Cl. ..................... 375/330; 369/30.38; 369/30.4
(58) Field of Classification Search ................. 375/330, 375/325, 324, 326, 327; 369/30.38, 30.4, 369/30.46, 30.52, 30.59, 43, 44.2
See application file for complete search history.

(56) References Cited

U.S. PATENT DOCUMENTS

| 4,712,221 A * | 12/1987 | Pearce et al. ................. 375/232 |
| 6,349,078 B1 * | 2/2002 | Hsu et al. ................. 369/30.16 |
| 2002/0122364 A1 * | 9/2002 | Worthington et al. ..... 369/47.35 |
| 2004/0228233 A1 * | 11/2004 | Hiratsuka ................. 369/44.28 |

* cited by examiner

*Primary Examiner*—David C Payne
*Assistant Examiner*—Rahel Guarino
(74) *Attorney, Agent, or Firm*—John J. Patti; Wade J. Brady, III; Frederick J. Telecky, Jr.

(57) ABSTRACT

The objective of this invention is to perform high-precision tracking error detection and tracking control using digital circuitry at relatively low speed and with a small circuit scale. Tracking servo circuit is formed as a single-chip circuit. Low-pass filters (LPF) and gain control amplifiers (GCA) of the input portion are analog circuits, while the circuits after analog-digital (A/D) converters, that is, offset cancellation circuits, equalizers (EQ), first and second phase difference detectors, adder, low-pass filter (LPF), gain control amplifier (GCA), and servo DSP are all digital circuits.

13 Claims, 13 Drawing Sheets

CASE 0 sign($A_n$)≠sign($B_n$)
sign($A_{n-1}$)≠sign($A_n$)
sign($B_{n-1}$)≠sign($B_n$)

CASE 0-0

WHEN $\dfrac{|A_n|}{|A_{n-1}-A_n|} \geqq \dfrac{|B_n|}{|B_{n-1}-B_n|}$ $$Q00_n = T_A + T_B = \frac{|A_n|}{|A_{n-1}-A_n|} + \frac{|B_{n-1}|}{|B_{n-1}-B_n|} \quad \cdots\cdots (2)$$

FIG. 9

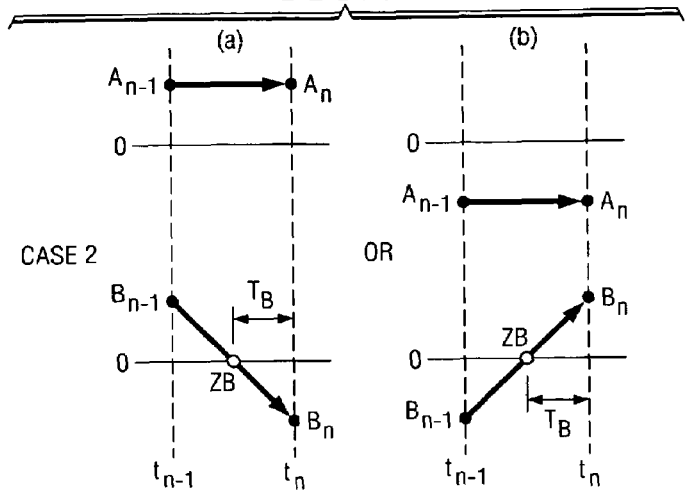

$\text{sign}(A_n) \neq \text{sign}(B_n)$
$\text{sign}(A_{n-1}) = \text{sign}(A_n)$
$\text{sign}(B_{n-1}) \neq \text{sign}(B_n)$ $$Q2_n = -T_B = \frac{|B_n|}{|B_{n-1} - B_n|} \quad \cdots\cdots (5)$$

FIG. 10

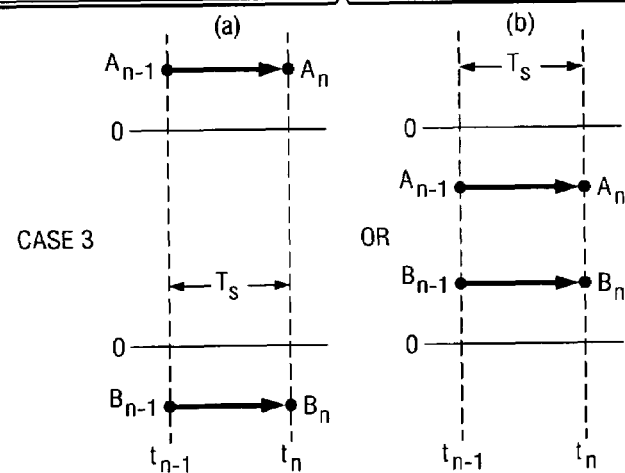

$\text{sign}(A_n) \neq \text{sign}(B_n)$
$\text{sign}(A_{n-1}) = \text{sign}(A_n)$
$\text{sign}(B_{n-1}) = \text{sign}(B_n)$ $Q3_n = T_S = 1$ (WHEN THE IMMEDIATELY PRECEDING INTERVAL IS CASE 0-0 OR CASE 1)
$Q3_n = -T_S = -1$ (WHEN THE IMMEDIATELY PRECEDING INTERVAL IS CASE 0-1 OR CASE 2) ⎬ ······ (6)
$Q3_n = Q3_{n-1}$ (OTHERWISE)

CASE 4 sign($A_n$) = sign($B_n$)
sign($A_{n-1}$) ≠ sign($A_n$)
sign($B_{n-1}$) ≠ sign($B_n$)

$$Q4_n = T_A - T_B = \frac{|A_n|}{|A_{n-1}-A_n|} - \frac{|B_n|}{|B_{n-1}-B_n|} \quad \cdots\cdots (7)$$

CASE 5 sign($A_n$) = sign($B_n$)
sign($A_{n-1}$) ≠ sign($A_n$)
sign($B_{n-1}$) = sign($B_n$)

$$Q5_n = -T_A = -\frac{|A_{n-1}|}{|A_{n-1}-A_n|} \quad \cdots\cdots (8)$$

| | |
|---|---|
| CASE 0-0 | $Q00_n = \dfrac{|A_n|}{|A_{n-1}-A_n|} + \dfrac{|B_{n-1}|}{|B_{n-1}-B_n|}$ |
| CASE 0-1 | $Q01_n = -\dfrac{|A_{n-1}|}{|A_{n-1}-A_n|} - \dfrac{|B_n|}{|B_{n-1}-B_n|}$ |
| CASE 1 | $Q1_n = \dfrac{|A_n|}{|A_{n-1}-A_n|}$ |
| CASE 2 | $Q2_n = -\dfrac{|B_n|}{|B_{n-1}-B_n|}$ |
| CASE 3 | $Q3_n = 1$ (PREVIOUS CASE = 0-0 OR 1) |
| | $Q3_n = -1$ (PREVIOUS CASE = 0-1 OR 2) |
| | $Q3_n = Q3_{n-1}$ (OTHER CASE) |
| CASE 4 | $Q4_n = \dfrac{|A_n|}{|A_{n-1}-A_n|} - \dfrac{|B_n|}{|B_{n-1}-B_n|}$ |
| CASE 5 | $Q5_n = -\dfrac{|A_{n-1}|}{|A_{n-1}-A_n|}$ |
| CASE 6 | $Q6_n = \dfrac{|B_{n-1}|}{|B_{n-1}-B_n|}$ |
| CASE 7 | $Q7_n = 0$ |

*FIG. 15*

TRACKING ERROR DETECTION AND CORRECTION METHODS AND APPARATUS

The invention relates tracking servo methods and apparatus for an optical disc device. In particular, the invention relates to methods and apparatus for detecting or correcting the tracking error using a DPD (Differential Phase Detection) system.

BACKGROUND

FIG. 19 illustrates an example of a prior art tracking servo mechanism using the DPD (Differential Phase Detection) system. This tracking servo mechanism is often adopted for optical discs, such as DVDs (Digital Versatile Discs or Digital Video Discs).

A laser beam LB, focused on a signal recording surface of an optical disc 102, is reflected from the signal recording surface. The reflected beam is detected and photoelectrically converted by optical pickup 100 to produce a radio frequency (RF) electric signal, whose waveform corresponds to the embossed pattern of the bit sequence. Here, photoelectric conversion part 104 of optical pickup 100 has, for example, four light-receiving regions A, B, C, D made up of photodiodes. Although not shown in the figure, the light-receiving regions A, B, C, D are divided and arranged so that they fit together obliquely from the four sides. RF signals A, C obtained from light-receiving regions A, C positioned on a diagonal have nearly the same phase as do RF signals B, D obtained from light-receiving regions B, D positioned on the other diagonal. The variation in the phase difference between RF signals A, C and RF signals B, D corresponds to the tracking error. Also, although photoelectric conversion parts 104 are actually within optical pickup 100, for the sake of clarity, photoelectric conversion parts 104 in FIG. 19 are shown individually extracted from optical pickup 100.

The tracking servo circuit comprises analog circuits including analog front end part 106, the first stage, and digital circuits comprising digital front end part 108, the second stage. The two front end parts 106, 108 are usually formed on different semiconductor chips.

In analog front end part 106, gain control amplifiers (GCA) 110, 112, 114, 116 adjust the amplitudes of RF signals A, B, C, D from photoelectric conversion part 104 of optical pickup 100, respectively. Equalizers (EQ) 118, 120, 122, 124 perform wave-shaping and noise reduction functions by emphasizing the high frequencies of RF signals A, B, C, D. Offset cancellation circuits 126, 128, 130, 132 eliminate offsets so that the central levels (zero levels) of RF signals A, B, C, D are aligned. Zero crossing detectors (ZRC) 134, 136, 138, 140 are made up of comparators comprised of op amps. As shown in FIG. 20, the times at which the voltage levels of RF signals A, B, C, D cross the reference level are detected, and a binary signal is output that has rising edges and falling edges corresponding to the zero-crossing times.

Binary signal (A) from comparator 134 (corresponding to RF signal A) and binary signal (B) from comparator 136 (corresponding to RF signal B) are input to phase difference detector 142. And, and, as shown in FIG. 21, a pulse signal with a variable pulse width that corresponds to the phase difference between the two binary signals (A) and (B) is output as a first phase difference signal φAB. This first phase difference signal φAB is output with a positive polarity when binary signal (A) leads binary signal (B), and is output with a negative polarity when binary signal (A) lags binary signal (B).

Binary signal (C) from comparator 138 (corresponding to RF signal C) and binary signal (D) from comparator 140 (corresponding to RF signal D) are input to phase difference detector 144. And, a pulse signal with a variable pulse width that corresponds to the phase difference between the two binary signals (C) and (D) is output as a second phase difference signal φCD. This second phase difference signal φCD is output with a positive polarity when binary signal (C) leads binary signal (D), and is output with a negative polarity when binary signal (C) lags binary signal (D).

First and second phase difference signals φAB and φCD output from the two phase difference detectors 142, 144 are added by an adder 146 which is made up of op amps. Basically, the summation signal φAB/CD output from adder 146 can be regarded as the tracking error signal of the DPD system. Usually, in order to retrieve the necessary error component for the tracking servo, output signal φAB/CD of adder 146 is averaged as it passes through low-pass filter (LPF) 148 (FIG. 21), and then passes through gain control amplifier (GCA) 150 for gain adjustment to obtain the tracking error signal sent to digital front end part 108.

Digital front end part 108 is comprised of analog-digital (A/D) converter 152 that converts the analog tracking error signal from analog front end part 106 to a digital tracking error signal, and servo processor (such as DSP: Digital Signal Processor) 154 that outputs a control signal for controlling the position of optical pickup 100 in the radial direction of optical disc 102 to actuator 156 as the feeding mechanism in response to the tracking error signal.

When the beam spot of laser beam LB deviates from the center of the track in the radial direction on the signal recording surface of optical disc 102, the phase difference between RF signals A, B and the phase difference between RF signals C, D will vary corresponding to the tracking deviation magnitude. The phase difference information, that is, the tracking error information, that is contained in output signals φAB, φCD of two phase difference detectors 142, 144, in output signal φAB/CD of adder 146, and, finally, in the output signal of low-pass filter (LPF) 148, is fed back to servo DSP 154. Corresponding to the fed back tracking error information, servo DSP 154 controls the position of optical pickup 100 in the radial direction through feed mechanism 156, so that the tracking servo circuit locks the beam spot of laser beam LB to a given track. Also, a digital-to-analog (D/A) converter (not shown in the figure) is placed between servo DSP 154 and feed mechanism 156.

As explained above, in the prior art, the tracking servo circuit is comprised of two chips 106, 108, where the size of equalizers (EQ) 118-124 and low-pass filter (LPF) 148 is particularly large. Consequently, the scale of the circuit of analog front end part 106 is large, which is undesirable. Thus, there is a demand that the circuit scale be reduced by integrating the entire tracking servo circuit onto a single chip by digitizing analog front end part 106. However, the zero crossing time obtained from the output of zero crossing detectors (ZRC) 134-140 made up of comparators is a continuous time value. Consequently, if zero crossing detectors (ZRC) 134-140 and phase difference detectors 142, 144 are made up of synchronized digital circuits as is, the measurement precision of the zero crossing time will depend on the clock frequency. Thus, there is a demand for an ultra-high-speed digital circuit that can operate at a clock frequency of tens of thousand of GHz in order to realize the same precision as that of the analog circuit, which is almost impossible to realize with the current digital technology. Because the zero crossing detectors (ZRC) 134-140 and phase difference detectors 142, 144 cannot be realized with synchronized digital circuits, even if only equalizers (EQ) 118-124 and low-pass filter (LPF) 148 are digitized, it is still difficult to connect the first- and second-stage circuits digitally. As a result, in the prior art, it is necessary that all of the functions of the first-stage analog front end part 106 be realized with analog circuits.

An object of the invention is to solve the aforementioned problems of the prior art by providing a tracking error detection method and circuit that enables high-precision detection of tracking errors with a digital circuit at a relatively low speed and with a small circuit scale.

Another object of the invention is to provide a tracking servo method and circuit that can perform high-precision tracking control with a digital circuit at a relatively low speed and with a small circuit scale.

Another object of the invention is to provide a method for high-precision detection of the phase difference of digital signals with a digital circuit at a relatively low speed and with a small circuit scale.

SUMMARY

In order to realize the aforementioned purposes, as the first tracking error detection method, the invention provides a tracking error detection method characterized by the fact that in the tracking error detection method of the DPD system in an optical disc device, there are the following processing steps: a processing step in which a first analog radio frequency signal and a second analog radio frequency signal, where the phase difference varies corresponding to the tracking error from the optical pickup, are converted into a first digital signal and a second digital signal at the same sampling frequency, respectively; a processing step in which the sign of the digital value is monitored in each sampling interval for the first digital signal and second digital signal, and, on the basis of the plural digital values before and after a change of sign, a prescribed approximation formula is used in the arithmetic operation to detect the times of zero crossing of the first and second radio frequency signals, respectively; and a processing step in which the time difference between the corresponding zero crossings of the first and second radio frequency signals is determined, and the digital tracking error signal representing the tracking error is generated.

As the first tracking error detector, the invention provides a type of tracking error detector characterized by the fact that in the tracking error detector of the DPD system in an optical disc device, there are the following parts: a first A/D converter and a second A/D converter that convert a first analog radio frequency signal and a second analog radio frequency signal, where the phase difference varies corresponding to the tracking error from the optical pickup, into a first digital signal and a second digital signal at the same sampling frequency, respectively; a first process detector and a second process detector that monitor the sign of the digital value in each sampling interval for the first digital signal and second digital signal, and, on the basis of the plural digital values before and after a change of sign, make use of a prescribed approximation formula in the arithmetic operations to detect the times of zero crossing in the first and second radio frequency signals, respectively; and a tracking error signal generator that determines the time difference between the corresponding zero crossings of the first and second radio frequency signals, and generates the digital tracking error signal representing the tracking error.

As the first tracking servo method of the invention, the invention provides a tracking servo method characterized by the fact that in the tracking servo method of the DPD system in an optical disc device, there are the following processing steps: a processing step in which a first analog radio frequency signal and a second analog radio frequency signal, where the phase difference varies corresponding to the tracking error from the optical pickup, are converted into a first digital signal and a second digital signal at the same sampling frequency, respectively; a processing step in which the sign of the digital value is monitored in each sampling interval for the first digital signal and second digital signal, and the pattern of the sign relationship between the digital values as a group obtained at two consecutive sampling points is judged; a processing step in which on the basis of the group of digital values in each sampling interval, a prescribed approximation formula is used in the arithmetic operations corresponding to the pattern of the sign relationship, and the operation result is output as the digital tracking error signal that represents the tracking error; and a processing step in which the position of the optical pickup is controlled in the radial direction of the optical disc corresponding to the tracking error signal.

As the first tracking servo circuit of the invention, the invention provides a type of tracking servo circuit characterized by the fact that in the tracking servo circuit of the DPD system in an optical disc device, there are the following parts: a first A/D converter and a second A/D converter that convert a first analog radio frequency signal and a second analog radio frequency signal, where the phase difference varies corresponding to the tracking error from the optical pickup, into a first digital signal and the second digital signal at the same sampling frequency, respectively; a first process detector and a second process detector that monitor the sign of the digital value in each sampling interval for the first digital signal and second digital signal, and, on the basis of the plural digital values before and after a change of sign, make use of a prescribed approximation formula in arithmetic operation to detect the times of zero crossing in the first and second radio frequency signals, respectively; a tracking error signal generator that determines the time difference between the corresponding zero crossings of the first and second radio frequency signals, and generates the digital tracking error signal representing the tracking error; and a tracking controller that controls the position of the optical pickup in the radial direction of the optical disc corresponding to the tracking error signal.

In the first tracking error detection method and circuit, the zero crossing times of the first and second radio frequency signals from the optical pickup are determined by means of interpolation using digital signal processing, and, from the time difference between the interpolated zero crossings corresponding to the two radio frequency signals (the time difference between the two zero crossing times), the digital tracking error signal, which represents the tracking error, is obtained. Also, in the first tracking servo method or circuit, the digital tracking error signal obtained by zero crossing interpolation in the digital signal processing is fed back to the position controller of the optical pickup.

As the second tracking error detection method of the invention, the invention provides a tracking error detection method characterized by the fact that in the tracking error detection method of the DPD system in an optical disc device, there are the following processing steps: a processing step in which a first analog radio frequency signal and a second analog radio frequency signal, where the phase difference varies corresponding to the tracking error from the optical pickup, are converted into a first digital signal and a second digital signal at the same sampling frequency, respectively; a processing step in which the sign of the digital value is monitored in each sampling interval for the first digital signal and second digital signal, and the pattern of the sign relationship between a group of digital values obtained at two consecutive sampling points is judged; and a processing step in which a prescribed arithmetic operation is performed corresponding to the pattern of the aforementioned sign relationship on the basis of the group of digital values for each sampling interval, and the result of the arithmetic operation is output as the digital tracking error signal that represents the tracking error.

As the second tracking error detector of the invention, the invention provides a type of tracking error detector characterized by the fact that in the tracking error detector of the DPD system in an optical disc device, there are the following parts: a first A/D converter and a second A/D converter that convert a first analog radio frequency signal and a second analog radio frequency signal, where the phase difference varies corresponding to the tracking error from the optical pickup, into a first digital signal and a second digital signal at the same sampling frequency, respectively; a sign pattern judgment part that monitors the sign of the digital value in each sampling interval for the first digital signal and second digital signal, and judges the pattern of the sign relationship between a group of digital values obtained at two consecutive sampling points; and a tracking error signal generator that performs a prescribed arithmetic operation corresponding to the pattern of the aforementioned sign relationship on the basis of the group of digital values for each sampling interval, and outputs the result of the arithmetic operation as the digital tracking error signal that represents the tracking error.

As the second tracking servo method of the invention, the invention provides a tracking servo method characterized by the fact that in the tracking servo method of the DPD system in an optical disc device, there are the following processing steps: a processing step in which a first analog radio frequency signal and a second analog radio frequency signal, where the phase difference varies corresponding to the tracking error from the optical pickup, are converted into the first digital signal and the second digital signal at the same sampling frequency, respectively; a processing step in which the sign of the digital value is monitored in each sampling interval for the first digital signal and second digital signal, and the pattern of the sign relationship between a group of digital values obtained at two consecutive sampling points is judged; a processing step in which a prescribed arithmetic operation is performed corresponding to the pattern of the aforementioned sign relationship on the basis of the group of digital values for each sampling interval, and the result of the arithmetic operation is output as the digital tracking error signal that represents the tracking error; and a processing step in which the position of the optical pickup is controlled in the radial direction of the optical disc corresponding to the tracking error signal.

As the second tracking servo circuit of the invention, the invention provides a type of tracking servo device characterized by the fact that in the tracking servo device of the DPD (Differential Phase Detection) system in an optical disc device, there are the following parts: a first A/D converter and a second A/D converter that convert a first analog radio frequency signal and a second analog radio frequency signal, where the phase difference varies corresponding to the tracking error from the optical pickup, into a first digital signal and a second digital signal at the same sampling frequency, respectively; a sign pattern judgment part that monitors the sign of the digital value in each sampling interval for the first digital signal and second digital signal, and judges the pattern of the sign relationship between a group of digital values obtained at two consecutive sampling points; a tracking error signal generator that performs a prescribed arithmetic operation corresponding to the pattern of the aforementioned sign relationship on the basis of the group of digital values for each sampling interval, and outputs the result of the arithmetic operation as the digital tracking error signal that represents the tracking error; and a tracking controller that controls the position of the optical pickup in the radial direction of the optical disc corresponding to the tracking error signal.

In the aforementioned second tracking error detection method and circuit of the invention, for the first and second radio frequencies from the optical pickup, the pattern of the sign relationship of the group of digital values in each sampling interval is judged, and, on the basis of the group of digital values, an arithmetic operation is performed using an operation formula corresponding to the pattern. As a result, the phase difference between the two RF signals, that is, the digital tracking error signal that represents the tracking error, is obtained during the period of the sampling interval. Also, in the second tracking servo method and circuit, the digital tracking error signal obtained in the digital signal processing is fed back to the position controller of the optical pickup.

As the third tracking error detection method of the invention, the invention provides a tracking error detection method characterized by the fact that in the tracking error detection method of the DPD system in an optical disc device, there are the following processing steps: a processing step in which a first analog radio frequency signal and a second analog radio frequency signal, where the phase difference varies corresponding to the tracking error from the optical pickup, are converted into a first digital signal and a second digital signal at the same sampling frequency; a processing step in which a third analog radio frequency signal and a fourth analog radio frequency signal, where the phase difference varies corresponding to the tracking error from the optical pickup, are converted into a third digital signal and a fourth digital signal at the same sampling frequency, respectively; a processing step in which the sign of the digital value is monitored in each sampling interval for the first digital signal and second digital signal, and, on the basis of the plural digital values before and after a change of sign, a prescribed approximation formula is used in the arithmetic operation to detect the times of zero crossing of the first and second radio frequency signals, respectively; a processing step in which the sign of the digital value is monitored in each sampling interval for the third digital signal and fourth digital signal, and, on the basis of the plural digital values before and after a change of sign, a prescribed approximation formula is used in the arithmetic operation to detect the times of zero crossing of the third and fourth radio frequency signals, respectively; a processing step in which the time difference between the corresponding zero crossings of the first and second radio frequency signals is determined, and a first digital tracking error signal representing the tracking error is generated; a processing step in which the time difference between the corresponding zero crossings of the third and fourth radio frequency signals is determined, and a second digital tracking error signal representing the tracking error is generated; and a processing step in which the first tracking error signal and the second tracking error signal are combined to generate a synthetic tracking error signal.

As the third tracking error detector, the invention provides a type of tracking error detector characterized by the fact that in the tracking error detector of the DPD system in an optical disc device, there are the following parts: a first A/D converter and a second A/D converter that convert a first analog radio frequency signal and a second analog radio frequency signal, where the phase difference varies corresponding to the tracking error from the optical pickup, into a first digital signal and the second digital signal at the same sampling frequency, respectively; a third A/D converter and a fourth A/D converter that convert a third analog radio frequency signal and a fourth analog radio frequency signal, where the phase difference varies corresponding to the tracking error from the optical pickup, into a third digital signal and a fourth digital signal at the same sampling frequency, respectively; a first process detector and a second process detector that monitor the sign of the digital value in each sampling interval for the first digital signal and second digital signal, and, on the basis of the plural digital values before and after a change of sign, make use of a prescribed approximation formula in the arithmetic operation to detect the times of zero crossing in the first and second radio frequency signals, respectively; a third process detector and a fourth process detector that monitor the sign of the digital value in each sampling interval for the third digital signal and fourth digital signal, and, on the basis of the plural digital values before and after a change of sign, make use of a prescribed approximation formula in the arithmetic operation to detect the times of zero crossing in the third and fourth radio frequency signals, respectively; a first tracking error signal generator that determines the time difference between the corresponding zero crossings of the first and second radio frequency signals, and generates a first digital tracking error signal representing the tracking error; a second tracking error signal generator that determines the time difference between the corresponding zero crossings of the third and fourth radio frequency signals, and generates a second digital tracking error signal representing the tracking error; and an adder that combines the first tracking error signal and the second tracking error signal to generate a synthetic tracking error signal.

As the third tracking servo method of the invention, the invention provides a tracking servo method characterized by the fact that in the tracking servo method of the DPD system in an optical disc device, there are the following processing steps: a processing step in which a first analog radio frequency signal and a second-analog radio frequency signal, where the phase difference varies corresponding to the tracking error from the optical pickup, are converted into a first digital signal and a second digital signal at the same sampling frequency; a processing step in which a third analog radio frequency signal and a fourth analog radio frequency signal, where the phase difference varies corresponding to the tracking error from the optical pickup, are converted into a third digital signal and a fourth digital signal at the same sampling frequency, respectively; a processing step in which the sign of the digital value is monitored in each sampling interval for the first digital signal and second digital signal, and, on the basis of the plural digital values before and after a change of sign, a prescribed approximation formula is used in the arithmetic operation to detect the times of zero crossing in the first and second radio frequency signals, respectively; a processing step in which the sign of the digital value is monitored in each sampling interval for the third digital signal and fourth digital signal, and, on the basis of the plural digital values before and after a change of sign, a prescribed approximation formula is used in the arithmetic operation to detect the times of zero crossing in the third and fourth radio frequency signals, respectively; a processing step in which the time difference between the corresponding zero crossings of the first and second radio frequency signals is determined, and a first digital tracking error signal representing the tracking error is generated; a processing step in which the time difference between the corresponding zero crossings of the third and fourth radio frequency signals is determined, and a second digital tracking error signal representing the tracking error is generated; a processing step in which the first tracking error signal and the second tracking error signal are combined to generate a synthetic tracking error signal; and a processing step in which the position of the optical pickup is controlled in the radial direction of the optical disc corresponding to the tracking error signal.

As the third tracking servo circuit of the invention, the invention provides a type of tracking servo device characterized by the fact that in the tracking servo device of the DPD (Differential Phase Detection) system in an optical disc device, there are the following parts: a first A/D converter and a second A/D converter that convert a first analog radio frequency signal and a second analog radio frequency signal, where the phase difference varies corresponding to the tracking error from the optical pickup, into a first digital signal and a second digital signal at the same sampling frequency, respectively; a third A/D converter and a fourth A/D converter that convert a third analog radio frequency signal and a fourth analog radio frequency signal, where the phase difference varies corresponding to the tracking error from the optical pickup, into a third digital signal and a fourth digital signal at the same sampling frequency, respectively; a first process detector and a second process detector that monitor the sign of the digital value in each sampling interval for the first digital signal and second digital signal, and, on the basis of the plural digital values before and after a change of sign, make use of a prescribed approximation formula in the arithmetic operation to detect the times of zero crossing in the first and second radio frequency signals, respectively; a third process detector and a fourth process detector that monitor the sign of the digital value in each sampling interval for the third digital signal and fourth digital signal, and, on the basis of the plural digital values before and after a change of sign, make use of a prescribed approximation formula in the arithmetic operation to detect the times of zero crossing in the third and fourth radio frequency signals, respectively; a first tracking error signal generator that determines the time difference between the corresponding zero crossings of the first and second radio frequency signals, and generates a first digital tracking error signal representing the tracking error; a second tracking error signal generator that determines the time difference between the corresponding zero crossings of the third and fourth radio frequency signals, and generates a second digital tracking error signal representing the tracking error; an adder that combines the first tracking error signal and the second tracking error signal to generate a synthetic tracking error signal; and a tracking controller that controls the position of the optical pickup in the radial direction of the optical disc corresponding to the tracking error signal.

For the third tracking error detection method and circuit of the invention, the zero crossing times of the first and second radio frequency signals from the optical pickup are determined by interpolation using digital signal processing, and, from the time difference between the corresponding interpolated zero crossings of the two radio frequency signals (the time difference between the two zero crossing times), the first digital tracking error signal, which indicates the tracking error, is obtained. The zero crossing times of the third and fourth radio frequency signals from the optical pickup are also determined by interpolation using digital signal processing, and, from the time difference between the corresponding interpolated zero crossings of the two radio frequency signals (the time difference between the two zero crossing times), the second digital tracking error signal indicating the tracking error is obtained. Then, the first and second tracking error signals are added to generate a synthetic tracking error signal. In the third tracking servo method and circuit, the synthetic tracking error signal obtained by interpolation of the zero crossing times by the digital signal processing is fed back to the position controller of the optical pickup.

As the fourth tracking error detection method, the invention provides a tracking error detection method characterized by the fact that in the tracking error detection method of the DPD system in an optical disc device, there are the following processing steps: a processing step in which a first analog radio frequency signal and a second analog radio frequency signal, where the phase difference varies corresponding to the tracking error from the optical pickup, are converted into a first digital signal and a second digital signal at the same sampling frequency; a processing step in which a third analog radio frequency signal and a fourth analog radio frequency signal, where the phase difference varies corresponding to the tracking error from the optical pickup, are converted into a third digital signal and a fourth digital signal at the same sampling frequency, respectively; a processing step in which the sign of the digital value is monitored in each sampling interval for the first digital signal and second digital signal, and, on the basis of the group of digital values obtained at two consecutive sampling points, an arithmetic operation is performed using a prescribed operation formula corresponding to the pattern of the sign relationship between the digital values, and the operation result is output as the first digital tracking error signal that represents the tracking error; a processing step in which the sign of the digital value is monitored in each sampling interval for the third digital signal and fourth digital signal, and, on the basis of the group of digital values obtained at two consecutive sampling points, an arithmetic operation is performed using a prescribed operation formula corresponding to the pattern of the sign relationship between the digital values, and the operation result is output as the second digital tracking error signal that represents the tracking error; and a processing step in which the first tracking error signal and the second tracking error signal are combined to generate a synthetic tracking error signal.

As the fourth tracking error detector of the invention, the invention provides a type of tracking error detector characterized by the fact that in the tracking error detector of the DPD system in an optical disc device, there are the following parts: a first A/D converter and a second A/D converter that convert a first analog radio frequency signal and a second analog radio frequency signal, where the phase difference varies corresponding to the tracking error from the optical pickup, into a first digital signal and a second digital signal at the same sampling frequency, respectively; a third A/D converter and a fourth A/D converter that convert a third analog radio frequency signal and a fourth analog radio frequency signal, where the phase difference varies corresponding to the tracking error from the optical pickup, into a third digital signal and a fourth digital signal at the same sampling frequency, respectively; a first tracking error signal generator that monitors the sign of the digital value in each sampling interval for the first digital signal and second digital signal, and, on the basis of the group of digital values obtained at two consecutive sampling points, performs an arithmetic operation using a prescribed operation formula corresponding to the pattern of the sign relationship between the digital values, and outputs the operation result as the first digital tracking error signal that represents the tracking error; a second tracking error signal generator that monitors the sign of the digital value in each sampling interval for the third digital signal and fourth digital signal, and, on the basis of the group of digital values obtained at two consecutive sampling points, performs an arithmetic operation using a prescribed operation formula corresponding to the pattern of the sign relationship between the digital values, and outputs the operation result as the second digital tracking error signal that represents the tracking error; and an adder that combines the first tracking error signal and the second tracking error signal to generate a synthetic tracking error signal.

As the fourth tracking servo method, the invention provides a tracking servo method characterized by the fact that in the tracking servo method of the DPD system in an optical disc device, there are the following processing steps: a processing step in which a first analog radio frequency signal and a second analog radio frequency signal, where the phase difference varies corresponding to the tracking error from the optical pickup, are converted into a first digital signal and a second digital signal at the same sampling frequency; a processing step in which a third analog radio frequency signal and a fourth analog radio frequency signal, where the phase difference varies corresponding to the tracking error from the optical pickup, are converted into a third digital signal and a fourth digital signal at the same sampling frequency, respectively; a processing step in which the sign of the digital value is monitored in each sampling interval for the first digital signal and second digital signal, and, on the basis of the group of digital values obtained at two consecutive sampling points, an arithmetic operation is performed using a prescribed operation formula corresponding to the pattern of the sign relationship between the digital values, and the operation result is output as the first digital tracking error signal that represents the tracking error; a processing step in which the sign of the digital value is monitored in each sampling interval for the third digital signal and fourth digital signal, and, on the basis of the group of digital values obtained at two consecutive sampling points, an arithmetic operation is performed using a prescribed operation formula corresponding to the pattern of the sign relationship between the digital values, and the operation result is output as the second digital tracking error signal that represents the tracking error; a processing step in which the first tracking error signal and the second tracking error signal are combined to generate a synthetic tracking error signal; and a processing step in which the position of the optical pickup is controlled in the radial direction of the optical disc corresponding to the tracking error signal.

As the fourth tracking servo circuit, the invention provide a type of tracking servo device characterized by the fact that in the tracking servo device of the DPD system in an optical disc device, there are the following parts: a first A/D converter and a second A/D converter that convert a first analog radio frequency signal and a second analog radio frequency signal, where the phase difference varies corresponding to the tracking error from the optical pickup, into a first digital signal and the second digital signal at the same sampling frequency, respectively; a third A/D converter and a fourth A/D converter that convert a third analog radio frequency signal and a fourth analog radio frequency signal, where the phase difference varies corresponding to the tracking error from the optical pickup, into a third digital signal and a fourth digital signal at the same sampling frequency, respectively; a first tracking error signal generator that monitors the sign of the digital value in each sampling interval for the first digital signal and second digital signal, and, on the basis of the group of digital values obtained at two consecutive sampling points, performs an arithmetic operation using a prescribed operation formula corresponding to the pattern of the sign relationship between the digital values, and outputs the operation result as the first digital tracking error signal that represents the tracking error; a second tracking error signal generator that monitors the sign of the digital value in each sampling interval for the third digital signal and fourth digital signal, and, on the basis of the group of digital values obtained at two consecutive sampling points, performs an arithmetic operation using a prescribed operation formula corresponding to the pattern of the sign relationship between the digital values, and outputs the operation result as the second digital tracking error signal that represents the tracking error; an adder that combines the first tracking error signal and the second tracking error signal to generate a synthetic tracking error signal; and a tracking controller that controls the position of the optical pickup in the radial direction of the optical disc corresponding to the tracking error signal.

In the aforementioned fourth tracking error detection method and circuit, with respect to the first and second radio frequency signals from the optical pickup, the pattern of the sign relationship of the group of digital values in each sampling interval is judged, and, at the same time, on the basis of the group of digital values, an operation formula corresponding to the pattern is adopted in the arithmetic operation, and the first digital tracking error signal that indicates the phase difference between the two radio frequency signals, that is, the tracking error, is obtained in the period of the sampling interval. At the same time, with respect to the third and fourth radio frequency signals from the optical pickup, the pattern of the sign relationship of the group of digital values in each sampling interval is judged, and at the same time, on the basis of the group of digital values, an operation formula corresponding to the pattern is adopted in the arithmetic operation, and the second digital tracking error signal that indicates the phase difference between the two radio frequency signals, that is, the tracking error, is obtained in the period of the sampling interval. Then, the first and second tracking error signals are added to generate the synthetic tracking error signal. For the third tracking servo method and device, the synthetic tracking error signal obtained by interpolation of the zero crossing of the digital signal processing is fed back to the position controller of the optical pickup.

As the first method for detecting the phase difference of the digital signal, the invention provides a method with the following processing steps: a processing step in which the polarity and value of the first digital value of the first digital signal with respect to the first reference value are held; a processing step in which the polarity and value of the second digital value of the first digital signal with respect to the first reference value are held; a processing step in which on the basis of the polarity and value of the first digital value of the first digital signal and the polarity and value of the second digital value of the first digital signal, the crossing point of the first digital signal with respect to the first reference value is computed; a processing step in which the polarity and value of the first digital value of the second digital signal with respect to the second reference value are held; a processing step in which the polarity and value of the second digital value of the second digital signal with respect to the second reference value are held; a processing step in which on the basis of the polarity and value of the first digital value of the second digital signal and the polarity and value of the second digital value of the second digital signal, the crossing point of the second digital signal with respect to the second reference value is computed; and a processing step in which on the basis of the crossing point of the first digital signal and the crossing point of the second digital signal, the phase difference between the first digital signal and the second digital signal is computed.

In a preferred method for detection of the phase difference, the crossing point is computed on the basis of the quotient obtained by dividing the value of the first digital value or the value of the second digital value by the difference between the value of the first digital value and the value of the second digital value when the polarity of the first digital value and that of the second digital value are different. Also, it is preferred that the first and second reference values be reference voltages.

As the second method for detecting the phase difference of the digital signal, the invention provides a method having the following processing steps: a processing step in which the polarity and value of the first digital value of the first digital signal with respect to the first reference value are held; a processing step in which the polarity and value of the second digital value of the first digital signal with respect to the first reference value are held; a processing step in which the polarity and value of the first digital value of the second digital signal with respect to second reference value are held; a processing step in which the polarity and value of the second digital value and the second digital signal with respect to the second reference value are held; and a processing step in which the signal indicating the phase difference between the first digital signal and the second digital signal is computed on the basis of the value of the first digital value of the first digital signal, the value of the second digital value of the first digital signal, the value of the first digital value of the second digital signal, the value of the second digital value of the second digital signal, the difference between the value of the first digital value of the first digital signal and the value of the second digital value of the first digital signal, and the difference between the value of the first digital value of the second digital signal and the value of the second digital value of the second digital signal corresponding to the pattern classified on the basis of the relationship between the polarity of the first digital value of the first digital signal and the polarity of the second digital value of the first digital signal, the relationship between the polarity of the first digital value of the second digital signal and the polarity of the second digital value of the second digital signal, the relationship between the polarity of the first digital value of the first digital signal and the polarity of the first digital value of the second digital signal, or the relationship between the polarity of the second digital value of the first digital signal and the polarity of the second digital value of the second digital signal.

As a preferred method for detection of the phase difference, an arithmetic operation corresponding to the pattern is performed on the basis of the quotient obtained by dividing the value of the first digital value of the first digital signal by the difference between the value of the first digital value of the first digital signal and the value of the second digital value of the first digital signal, the quotient obtained by dividing the value of the second digital value of the first digital signal by the difference between the value of the first digital value of the first digital signal and the value of the second digital value of the first digital signal, the quotient obtained by dividing the value of the first digital value of the second digital signal by the difference between the value of the first digital value of the second digital signal and the value of the second digital value of the second digital signal, and the quotient obtained by dividing the value of the second digital value of the second digital signal by the difference between the value of the first digital value of the second digital signal and the value of the second digital value of the second digital signal.

BRIEF DESCRIPTION OF THE DRAWINGS

FIG. 9 is a diagram illustrating case (2) in the sign relationship pattern between a group of digital values.

FIG. 10 is a diagram illustrating case (3) in the sign relationship pattern between a group of digital values.

FIG. 15 shows a list of the corresponding relationships between the various cases and the various operation outputs obtained by the phase difference detector in the embodiment.

DETAILED DESCRIPTION OF THE EMBODIMENTS

As explained above, the tracking error detection method and circuit of the invention make possible high-precision detection of tracking errors with digital circuitry at relatively low speed and with a small circuit scale. Also, the tracking servo method and circuit of the invention make possible high-precision tracking control with digital circuitry at a relatively low speed and with a small circuit scale. In addition, the phase difference detection method of digital signals in the invention makes possible the high-precision detection of the phase difference between digital signals with digital circuitry at relatively low speed and with a small circuit scale.

A preferred embodiment of the invention will be explained below with reference to FIGS. 1-18.

Figure 1:
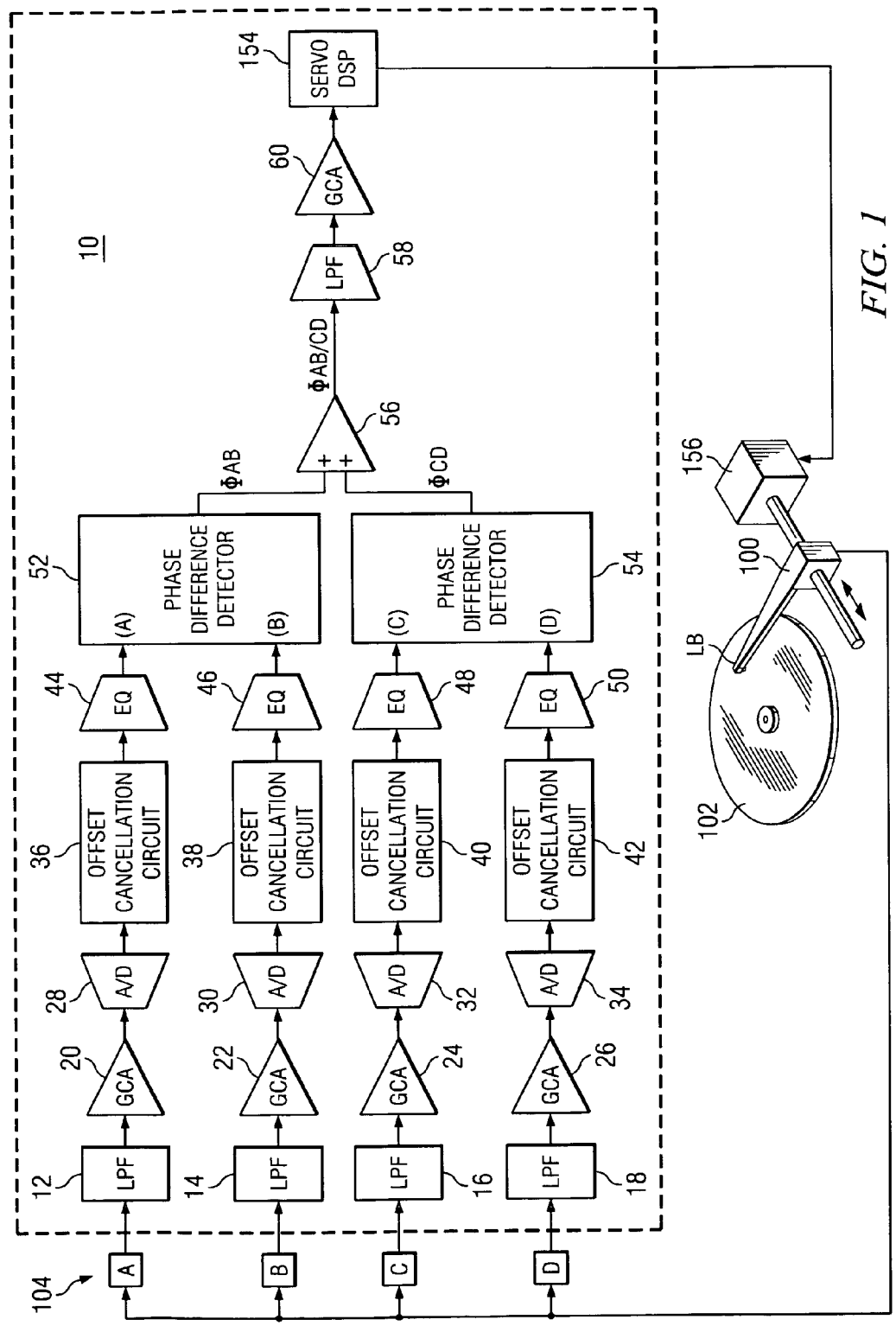
FIG. 1 is a block diagram illustrating the arrangement of a tracking servo mechanism for DVDs implemented as an embodiment of the invention.
Figure 19:
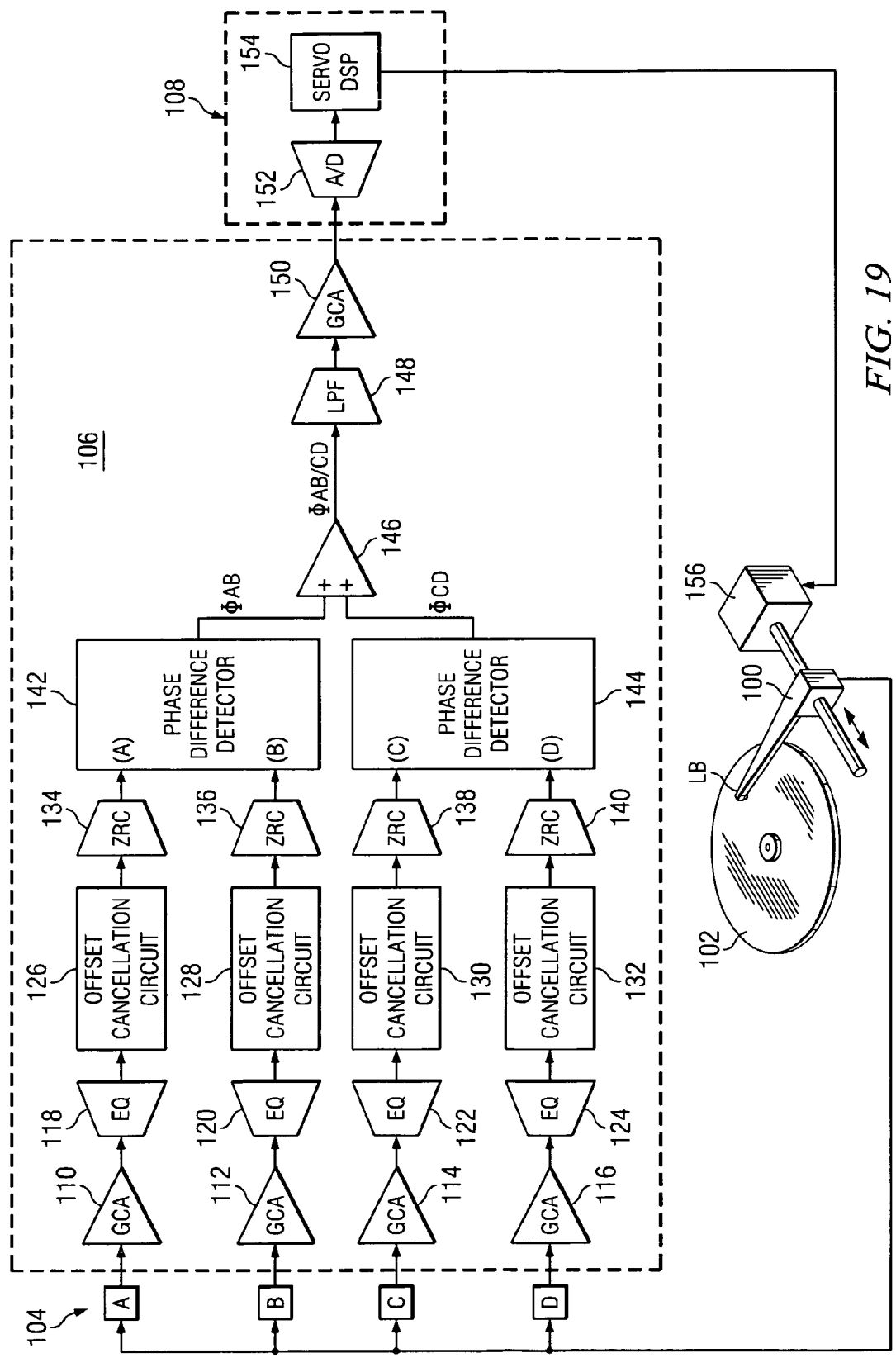
FIG. 19 is a block diagram illustrating the arrangement of the tracking servo mechanism of the prior art.
Figure 20:
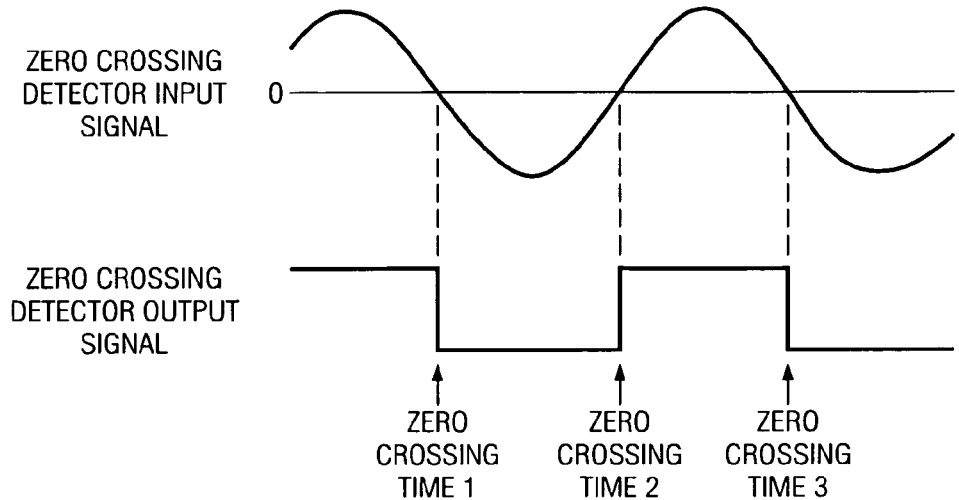
FIG. 20 is a waveform diagram illustrating the zero crossing detection method of the prior art.

FIG. 1 is a diagram illustrating the arrangement of the tracking servo mechanism for a DVD in an embodiment of the invention. In this figure, the arrangement and function of optical pickup 100, optical disc 102, photoelectric conversion part 104, servo DSP 154 and feed mechanism 156 are the same as those shown in FIG. 19 and will not be explained again.

In this embodiment, tracking servo circuit 10 can be formed as a hybrid circuit made up of analog and digital sections integrated on a single semiconductor chip. Only low-pass filters (LPF) 12-18 and gain control amplifiers (GCA) 20-26 of the input portion are analog circuits, the circuits following analog-digital (A/D) converters 28-34, that is, offset cancellation circuits 36-42, equalizers (EQ) 44-50, first and second phase difference detectors 52, 54, adder 56, low-pass filter (LPF) 58, gain control amplifier (GCA) 60, and servo DSP 154 are all digital circuits.

The low-pass filters (LPF) 12, 14, 16, 18 are anti-aliasing filters that remove noise in the radio frequency component contained in RF signals A, B, C, D from photoelectric conversion part 104 of optical pickup 100. The gain control amplifiers (GCA) 20, 22, 24, 26 adjust the amplitudes of the RF signals A, B, C, D. Analog/digital (A/D) converters 28, 30, 32, 34 convert RF signals A, B, C, D into digital signals at a prescribed sampling frequency (if the channel clock frequency is 4.36 MHz, the sampling frequency is 26.16 MHz, six times the channel frequency). Offset cancellation circuits 36, 38, 40, 42 remove the offset contained in the RF signals A, B, C, D and align the center levels (zero levels). Equalizers (EQ) 44, 46, 48, 50 perform wave-shaping and noise reduction functions by means of emphasizing the high frequencies of the RF signals by means of digital arithmetic operations on the RF signals A, B, C, D.

Phase difference detector 52 takes digital signal (A) input from equalizer (EQ) 44 corresponding to RF signal A and digital signal (B) input from equalizer (EQ) 46 corresponding to RF signal B, and by means of the digital arithmetic operations, to be explained below, the zero crossing times of the two RF signals A, B are detected, and first phase difference signal ΦAB indicating the time difference between the zero crossings of the two RF signals A, B is generated.

Phase difference detector 54 on the other side takes digital signal (C) input from equalizer (EQ) 48 corresponding to RF signal C and digital signal (D) input from equalizer (EQ) 50 corresponding to RF signal D, and by means of the digital arithmetic operations to be explained below, the zero crossing times of the two RF signals C, D are detected, and first phase difference signal ΦCD indicating the time difference between the zero crossings of the two RF signals C, D is generated.

The first and second phase difference signals ΦAB and ΦCD output from the two phase difference detectors 52, 54 are added by adder 56. Basically, the summation signal ΦAB/CD (ΦAB+ΦCD) output from the adder 56 can be used as the tracking error signal of the DPD system. In this embodiment, in order to improve stability and increase the response speed of the tracking servo, the output signal ΦAB/CD of adder 56 is averaged by passing through low-pass filter (LPF) 58, and it then passes through gain control amplifier (GCA) 60 for gain adjustment. The obtained signal, the tracking error signal, is output to servo DSP 154.

In this embodiment, when the beam spot of laser beam LB on the signal recording surface of optical disc 102 deviates from the center of the track in the radial direction, the phase difference between RF signals A and B and the phase difference between RF signals C and D will vary with the magnitude of the tracking deviation, and the output signals (ΦAB, ΦCD of both phase difference detectors 52, 54, the output signal ΦAB/CD of adder 56, and the phase difference information contained in the output signal of low-pass filter (LPF) 58, that is, the tracking error information, are fed back to servo DSP 154. Corresponding to the tracking error information fed back as described above, servo DSP 154 controls the position of optical pickup 100 in the radial direction by means of feed mechanism 156, so that the beam spot of laser beam LB is locked to the track by the tracking servo.

A characteristic feature of this embodiment is in the algorithm generated by the digital arithmetic operations on the first and second phase difference signals ΦAB, ΦCD in the two phase difference detectors 52, 54.

Figure 2:
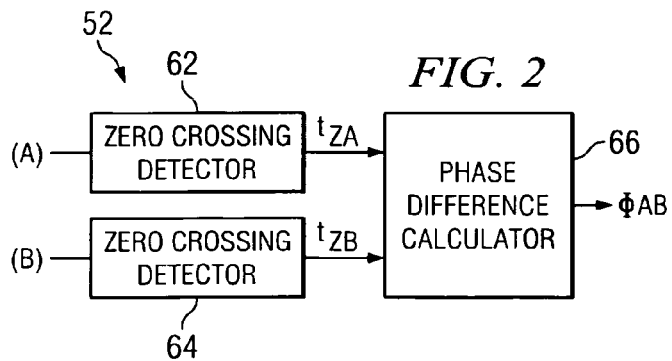
FIG. 2 is a block diagram illustrating the arrangement of phase difference detector 52 in an embodiment.
Figure 3:
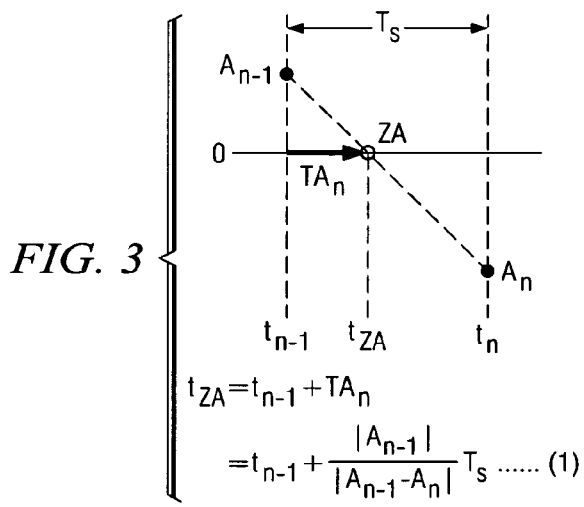
FIG. 3 is a diagram illustrating the algorithm of the zero crossing interpolation in the embodiment.

FIG. 2 is a diagram illustrating the arrangement of phase difference detector 52 in this embodiment. The phase difference detector 52 has zero crossing detectors 62, 64 that detect the zero crossing times of the two RF signals A, B, and phase difference calculator 66 that determines the time difference between the zero crossings of two RF signals A, B. The zero crossing detector 62 monitors the sign of the digital value in each sampling interval for digital signal (A) from equalizer (EQ) 44 corresponding to RF signal A, and, as shown in FIG. 3, on the basis of plural, e.g., two, digital values $A_{n-1}$, $A_n$ before and after a change of sign, a prescribed approximation formula, such as following first approximation formula (1) is used in the arithmetic operations, and time $t_{ZA}$ of zero crossing ZA in RF signal A is determined by interpolation:

$$t_{ZA} = t_{n-1} = |A_{n-1}|TS/|A_{n-1} - A_n| \quad (1)$$

Here, $t_{n-1}$ represents the sampling time immediately before a change of sign; TS represents the sampling period. If the time within the sampling period is normalized, TS=1.

Similarly, for digital signal (B) from equalizer (EQ) 46 corresponding to RF signals B, zero crossing detector 64 monitors the sign of the digital value of each sampling interval, and, on the basis of plural, e.g., two, digital values $B_{n-1}$, $B_n$ before and after a change of sign, a prescribed approximation formula, the approximation formula (1), is used in the arithmetic operations, and time $t_{ZB}$ of zero crossing ZB in RF signal B is determined by interpolation.

The phase difference calculator 66 determines time difference $(t_{ZA} - t_{ZB})$ between the corresponding interpolated zero crossings (consecutive) of two RF signal A, B, and outputs the digital signal indicating this time difference, that is, phase difference $(t_{ZA} - t_{ZB})$ as first phase difference signal ΦAB.

The phase difference detector 54 has the same arrangement as that of the phase difference detector 52 (FIG. 2), and has the same function (FIG. 3). Consequently, phase difference detector 54 outputs a digital signal indicating the time difference between the interpolated zero crossings corresponding to two RF signals C, D (consecutive), that is, the phase difference $(t_{ZC} - t_{ZD})$ of the two signals as second phase difference signals ΦCD.

Figure 4:
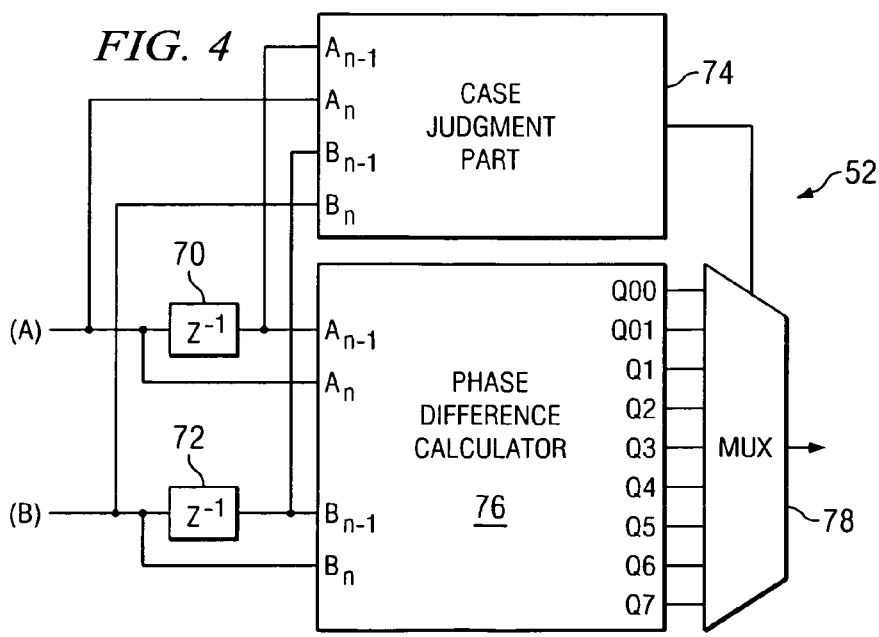
FIG. 4 is a block diagram illustrating the arrangement of phase difference detector 52 in another embodiment.

FIG. 4 is a diagram illustrating the arrangement of phase difference detector 52 in Embodiment 2. This phase difference detector 52 comprises 1-cycle delay circuits or delay registers $(Z^{-1})$ 70, 72, case judgment part 74, phase difference calculator 76 and multiplexer (MUX) 78.

The case judgment part 74 has, as inputs, the digital signals from equalizers (EQ) 44, 46 corresponding to the two RF signals A, B, and the respective digital signals from the previous samples, via $Z^{-1}$ delay registers $(Z^{-1})$ 70, 72; it judges the pattern of the sign relationship between a group of digital values $(A_{n-1}, B_{n-1}, A_n, B_n)$ obtained at two consecutive sampling points $(t_{n-1}, t_n)$ in each sampling interval. As shown in FIGS. 5-14, there are nine cases, that is, cases 0 (0-0, 0-1), 1, 2, 3, 4, 5, 6, and 7, in the sign relationship pattern for the group of digital values $(A_n, B_n, A_{n-1}, B_{n-1})$.

Figure 5:
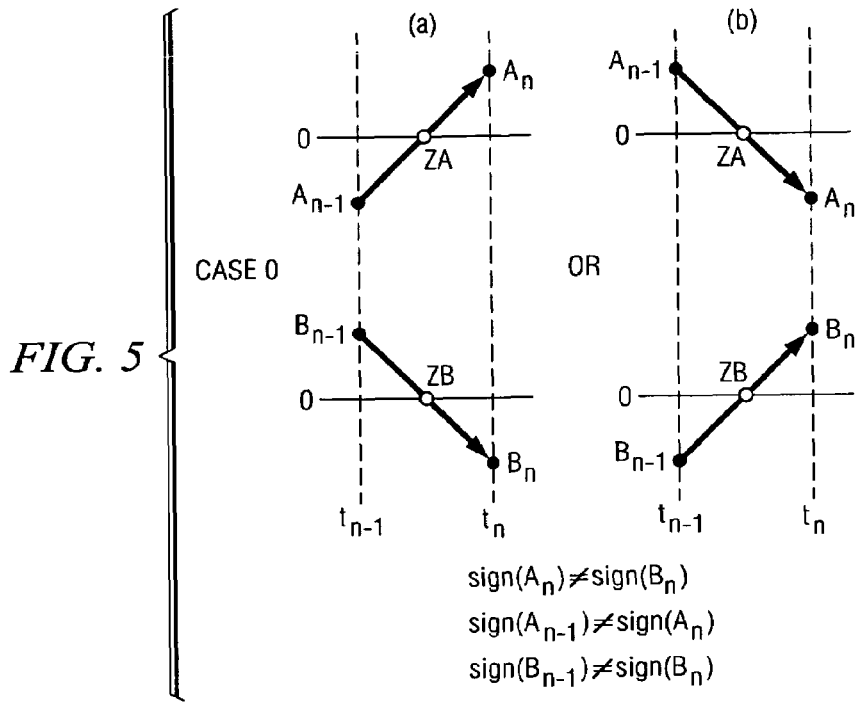
FIG. 5 is a diagram illustrating case 0 in the sign relationship pattern between a group of digital values.
Figure 6:
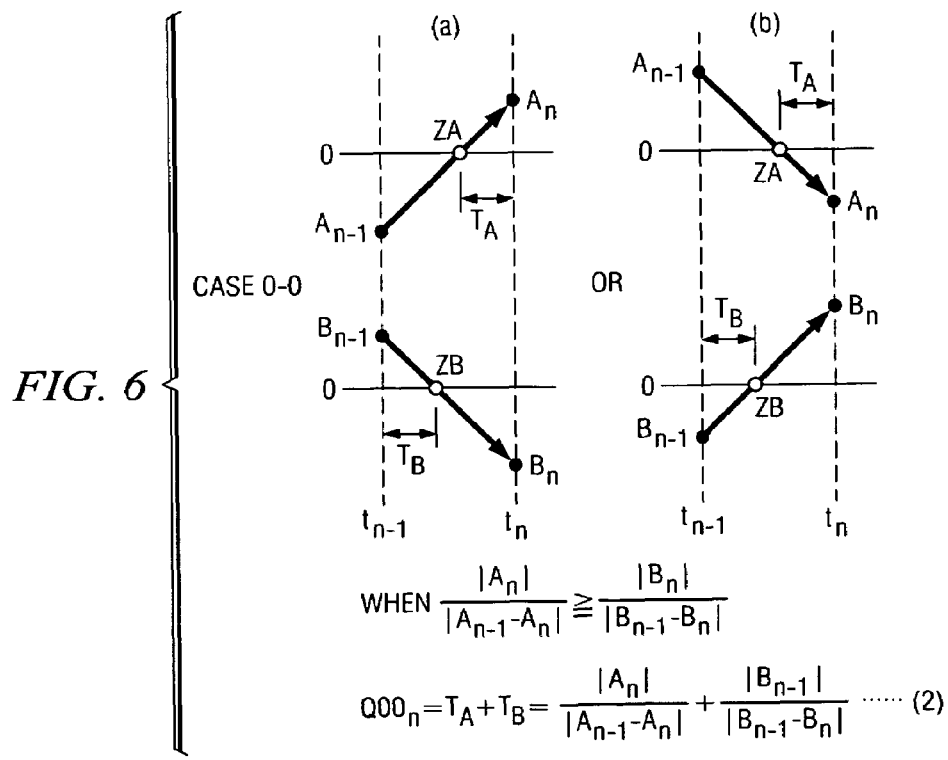
FIG. 6 is a diagram illustrating case (0-0) in the sign relationship pattern between a group of digital values.
Figure 7:
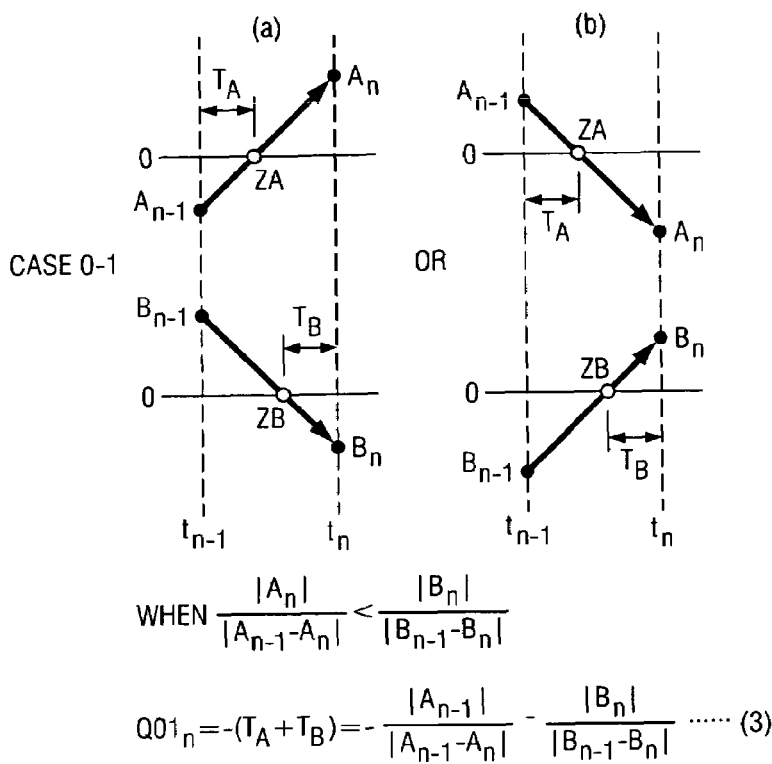
FIG. 7 is a diagram illustrating case (0-1) in the sign relationship pattern between a group of digital values.

As shown in FIG. 5, in case 0, the sign of $A_n$ may be different from the sign of $B_n$ (sign $A_n \neq$ sign $B_n$), the sign of $A_{n-1}$ may be different from the sign of $A_n$ (sign $A_{n-1} \neq$ sign $A_n$), and the sign of $B_{n-1}$ may be different from the sign of $B_n$ (sign $B_{n-1} \neq$ sign $B_n$). In this case 0, in addition, there is the first/second relationship of zero crossings ZA, ZB in the two RF signals A, B. FIG. 6 shows case 0-0, in which zero crossing ZA follows zero crossing ZB, and FIG. 7 shows case 0-1, in which zero crossing ZA precedes zero crossing ZB.

Figure 8:
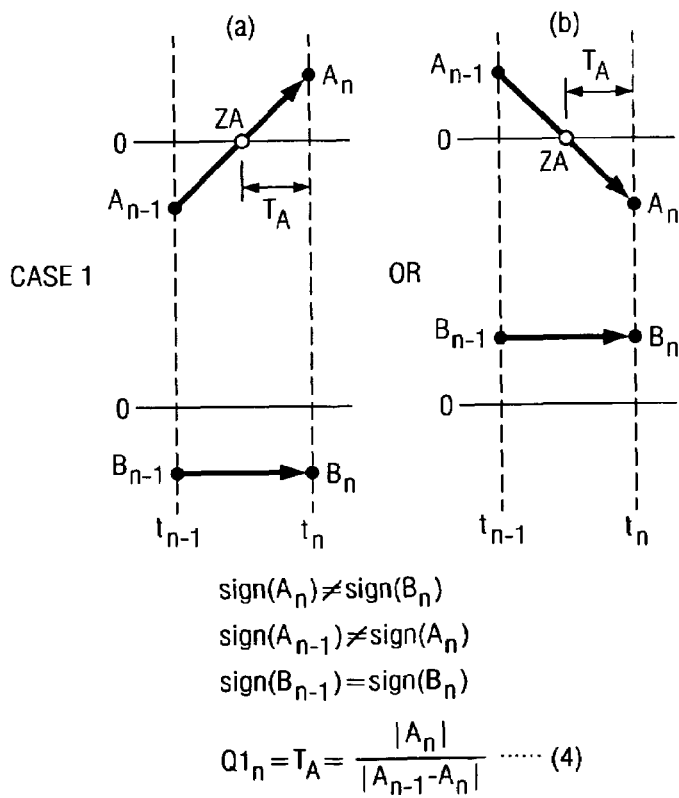
FIG. 8 is a diagram illustrating case (1) in the sign relationship pattern between a group of digital values.

As shown in FIG. 8, in case 1, the sign of $A_n$ may be different from the sign of $B_n$ (sign $A_n \neq$ sign $B_n$), the sign of $A_{n-1}$ may be different from the sign of $A_n$ (sign $A_{n-1} \neq$ sign $A_n$), and the sign of $B_{n-1}$ may be the same as the sign of $B_n$ (sign $B_{n-1} \neq$ sign $B_n$).

As shown in FIG. 9, in case 2, the sign of $A_n$ may be different from the sign of $B_n$ (sign $A_n \neq$ sign $B_n$), the sign of $A_{n-1}$ may be the same as the sign of $A_n$ (sign $A_{n-1}$=sign $A_n$), and the sign of $B_{n-1}$ may be different from the sign of $B_n$ (sign $B_{n-1} \neq$ sign $B_n$).

As shown in FIG. 10, in case 3, the sign of $A_n$ may be different from the sign of $B_n$ (sign $A_n \neq$ sign $B_n$), the sign of $A_{n-1}$ may be the same as the sign of An (sign $A_{n-1}$=sign $A_n$), and the sign of $B_{n-1}$ may be the same as the sign of $B_n$ (sign $B_{n-1}$=sign $B_n$).

Figure 11:
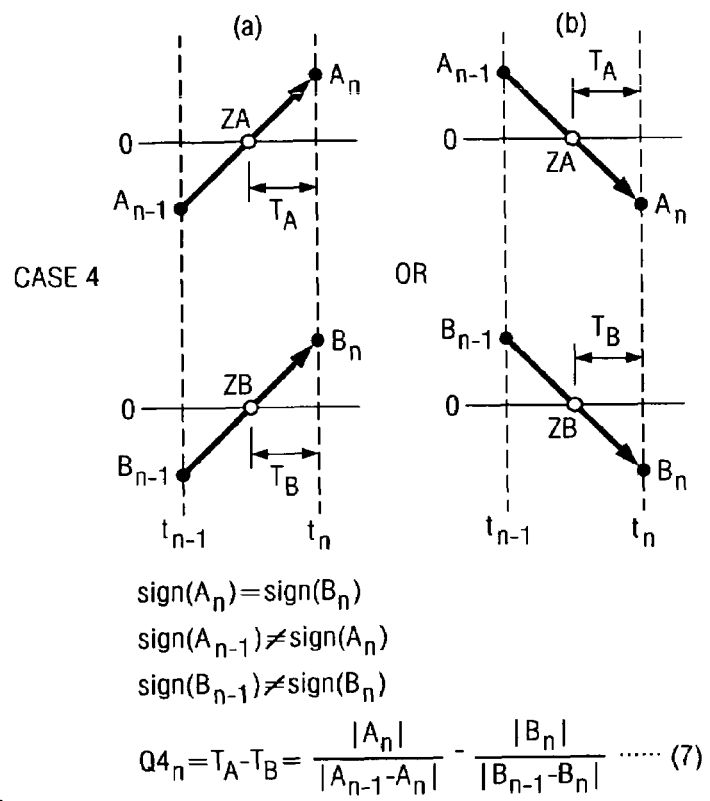
FIG. 11 is a diagram illustrating case (4) in the sign relationship pattern between a group of digital values.

As shown in FIG. 11, in case 4, the sign of $A_n$ may be different than the sign of $B_n$ (sign $A_n$=sign $B_n$), the sign of $A_{n-1}$ may be different from the sign of $A_n$ (sign $A_{n-1} \neq$ sign $A_n$), and the sign of $B_{n-1}$ may be different from the sign of $B_n$ (sign $B_{n-1} \neq$ sign $B_n$).

Figure 12:
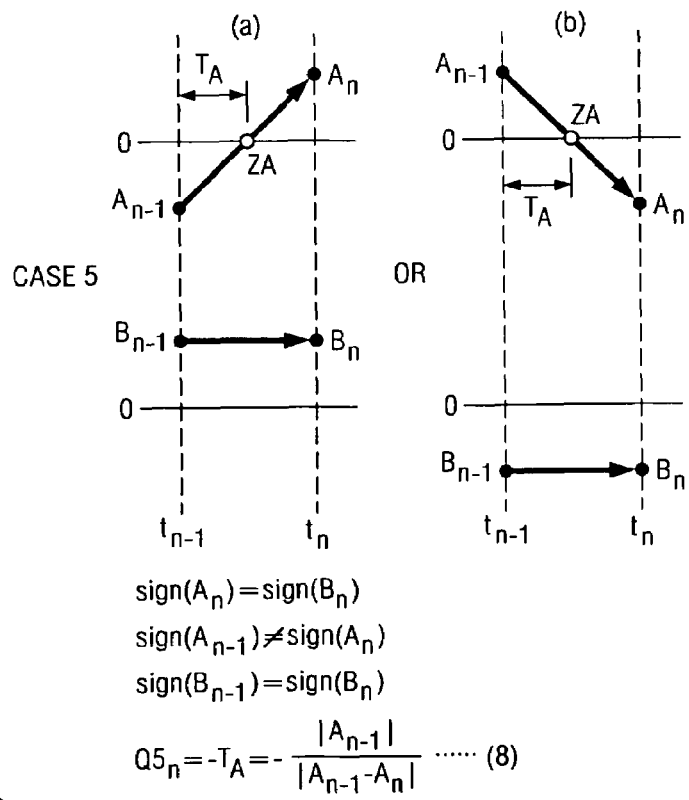
FIG. 12 is a diagram illustrating case (5) in the sign relationship pattern between a group of digital values.

As shown in FIG. 12, in case 5, the sign of $A_n$ may be different than the sign of $B_n$ (sign $A_n \neq$ sign $B_n$), the sign of $A_{n-1}$ may be different from the sign of $A_n$ (sign $A_{n-1} \neq$ sign $A_n$), and the sign of $B_{n-1}$ may be the same as the sign of $B_n$ (sign $B_{n-1}$=sign $B_n$).

Figure 13:
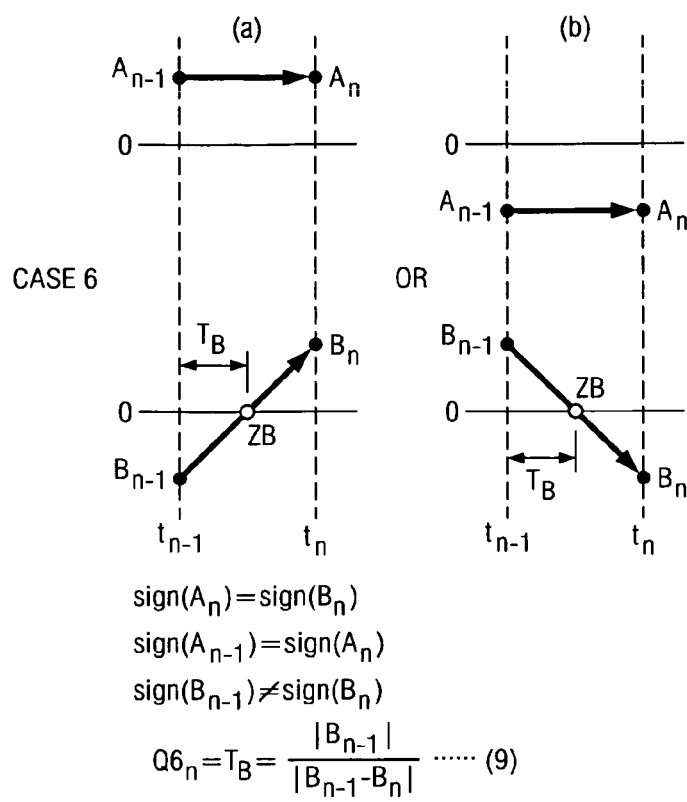
FIG. 13 is a diagram illustrating case (6) in the sign relationship pattern between a group of digital values.

As shown in FIG. 13, in case 6, the sign of $A_n$ may be the same as the sign of $B_n$ (sign $A_n$=sign $B_n$), the sign of $A_{n-1}$ may be the same as the sign of $A_n$ (sign $A_{n-1}$=sign $A_n$), and the sign of $B_{n-1}$ may be different from the sign of $B_n$ (sign $B_{n-1} \neq$ sign $B_n$).

Figure 14:
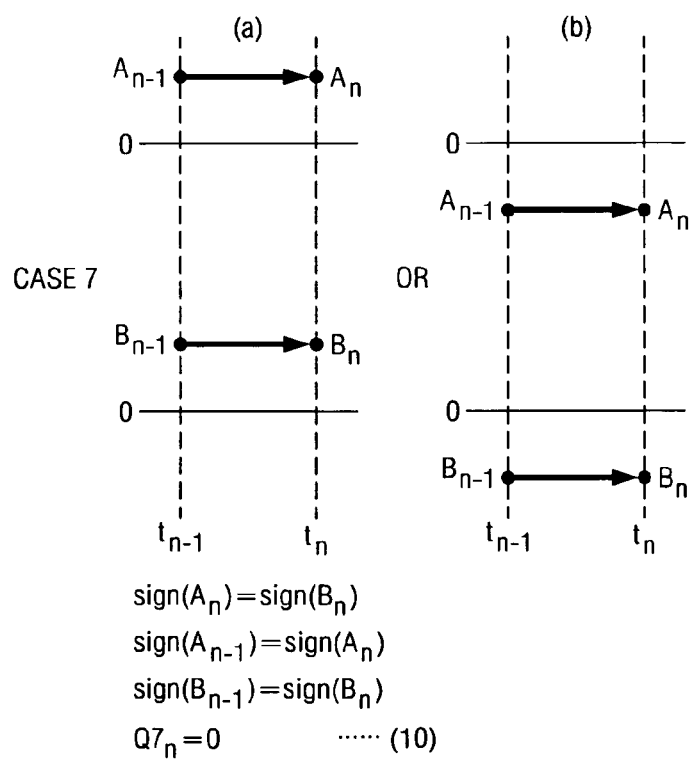
FIG. 14 is a diagram illustrating case (7) in the sign relationship pattern between a group of digital values.

As shown in FIG. 14, in case 7, the sign of $A_n$ may be the same as the sign of $B_n$ (sign $A_n$=sign $B_n$), the sign of $A_{n-1}$ may be the same as the sign of $A_n$ (sign $A_{n-1}$=sign $A_n$), and the sign of $B_{n-1}$ may be the same as the sign of $B_n$ (sign $B_{n-1}$=sign $B_n$).

Phase difference calculator 76 also has, as inputs, the digital signals from equalizers (EQ) 44, 46 corresponding to the two RF signals A, B and the respective 1-cycle delayed digital signals from $Z^{-1}$ delay registers 70, 72. This group of four variables $(A_{n-1}, B_{n-1}, A_n, B_n)$ are input at the same time and are processed using nine formulas to generate nine arithmetic operation outputs Q00n, Q01n, Q1n, Q2n, Q3n, Q4n, Q5n, Q6n, Q7n.

The first arithmetic operation output Q00n is the result of processing using the following computational formula (2), and, as shown in FIG. 6, it applies to case 0-0. Here, $T_A$, $T_B$ represent periods in which the signs of the two signals are different in a first approximation of the two RF signals A, B during the interval $(t_{n-1} \sim t_n)$.

$$Q00n = T_A + T_B \quad (2)$$
$$= |A_n|/|A_{n-1}| + |B_{n-1}|/|B_{n-1} - B_n|$$

The second arithmetic operation output Q01n is the result of processing using the following computational formula (3), and, as shown in FIG. 7, it applies to case 0-1. Here, $T_A$, $T_B$ represent periods in which the signs of the two signals are different in a first approximation of the two RF signals A, B during the interval $(t_{n-1} \sim t_n)$.

$$Q01n = (T_A + T_B) \tag{3}$$
$$= |A_{n-1}|/|A_{n-1} - A_n| - |B_n|/|B_{n-1} - B_n|$$

The third arithmetic operation output Q1n is the result of processing using the following computational formula (4), and, as shown in FIG. 8, it applies to case 1. Here, $T_A$ represents the period in which the signs of the two signals are different in a first approximation of the two RF signals A, B during the interval $(t_{n-1} \sim t_n)$.

$$Q1n = T_A \tag{4}$$
$$= |A_n|/|A_{n-1} - A_n|$$

The fourth arithmetic operation output Q2n is the result of processing using the following computational formula (5), and, as shown in FIG. 9, it applies to case 2. Here, $T_B$ represents the period in which the signs of the two signals are different in a first approximation of the two RF signals A, B during the interval $(t_{n-1} \sim t_n)$.

$$Q01n = -T_B \tag{5}$$
$$= -|B_n|/|B_{n-1} - B_n|$$

The fifth arithmetic operation output Q3n is the result of processing using the following computational formula (6), and, as shown in FIG. 10, it applies to case 3. Here, corresponding to the case of the immediately preceding interval $(t_{n-2} \sim t_{n-1})$, Q3 takes on one of the following three values:

$Q3n = T_s = 1$ (when the immediately preceding interval is case 0-0 or case 1)

$Q3n = -T_s = -1$ (when the immediately preceding interval is case 0-1 or case 2)

$$Q3n = Q3n-1 \text{ (otherwise)} \tag{6}$$

The sixth arithmetic operation output Q4n is the result of the processing using the following computational formula (7), and, as shown in FIG. 11, it applies to case 4. Here, $(T_A - T_B)$ represents the period when the sign on the side of RF signal A and the sign on the side of RF signal B are different from each other in a first approximation during the interval of $(t_{n-1} \sim t_n)$.

$$Q4n = T_A - T_B \tag{7}$$
$$= |A_n|/|A_{n-1} - A_n| - |B_n|/|B_{n-1} - B_n|$$

The seventh arithmetic operation output Q5n is the result of processing using the following computational formula (8), and, as shown in FIG. 12, it applies to case 5. Here, $T_A$ represents the period when the signs of the two RF signals A, B are different from each other in a first approximation during interval $(t_{n-1} \sim t_n)$.

$$Q5n = -T_A \tag{8}$$
$$= -|A_{n-1}|/|A_{n-1} - A_n|$$

The eighth arithmetic operation output Q6n is the result of processing using the following computational formula 9, and, as shown in FIG. 13, it applies to case 6. Here, $T_B$ represents the period when the signs of the two RF signals A, B are different from each other in a first approximation during interval of $(t_{n-1} \sim t_n)$.

$$Q6n = -T_B \tag{9}$$
$$= -|B_{n-1}|/|B_{n-1} - B_n|$$

The ninth arithmetic operation output Q7n is the result of processing using the following computational formula 10, and, as shown in FIG. 14, it applies to case 7. Here, there is no period in which the signs of the two RF signals A and B are different from each other in a first approximation during the interval $(t_{n-1} \sim t_n)$.

$$Q7n = 0 \tag{10}$$

The nine arithmetic operation outputs Q00n~Q7n obtained simultaneously using the phase difference calculator 76 are input at the same time to multiplexer (MUX) 78. Of these, the significant or effective arithmetic operation output that matches the pattern of the sign relationship between current input digital values $(A_{n-1}, B_{n-1}, A_n, B_n)$, that is, the result of the arithmetic operation using the operation formula corresponding to the case judged by case judgment part 74, is selected by multiplexer (MUX) 78 by the control signal from case judgment part 74. Consequently, when the pattern of the sign relationship between the group of four input digital values $(A_{n-1}, B_{n-1}, A_n, B_{n-1})$ obtained during any sampling interval is, e.g., case 5, during the next sampling interval, the seventh operation output Q5n is output from multiplexer (MUX) 78. FIG. 15 shows a list of the corresponding relationships between the cases 0-0, 0-1, 1, 2, 3, 4, 5, 6, 7 and the various operation outputs Q00n, Q01n, Q1n, Q2n, Q3n, Q4n, Q5n, Q6n, Q7n.

Figure 16:
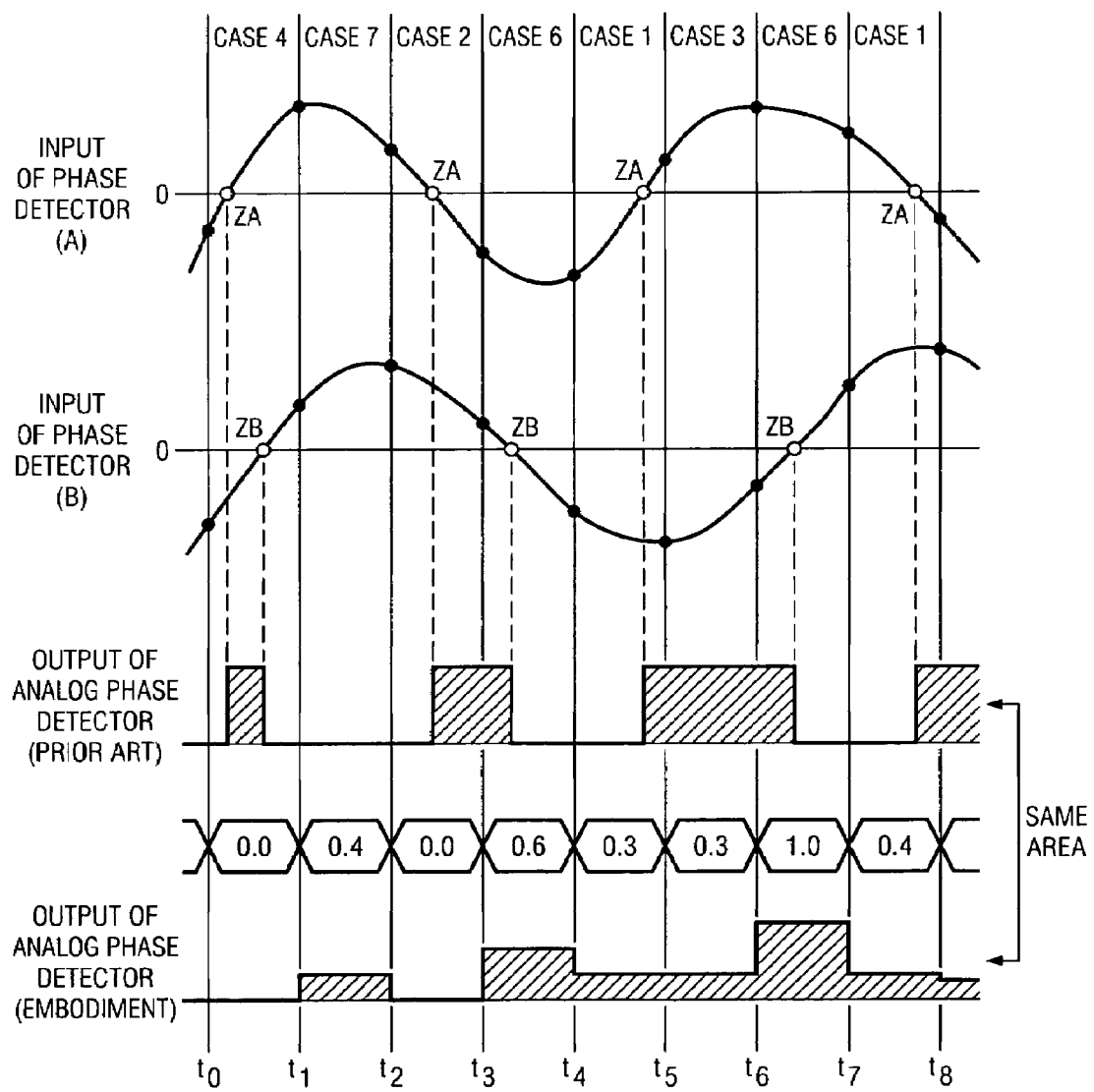
FIG. 16 is a waveform diagram illustrating the corresponding relationship between the analog signal processing system of the prior art and the digital signal processing system of the embodiment.
Figure 17:
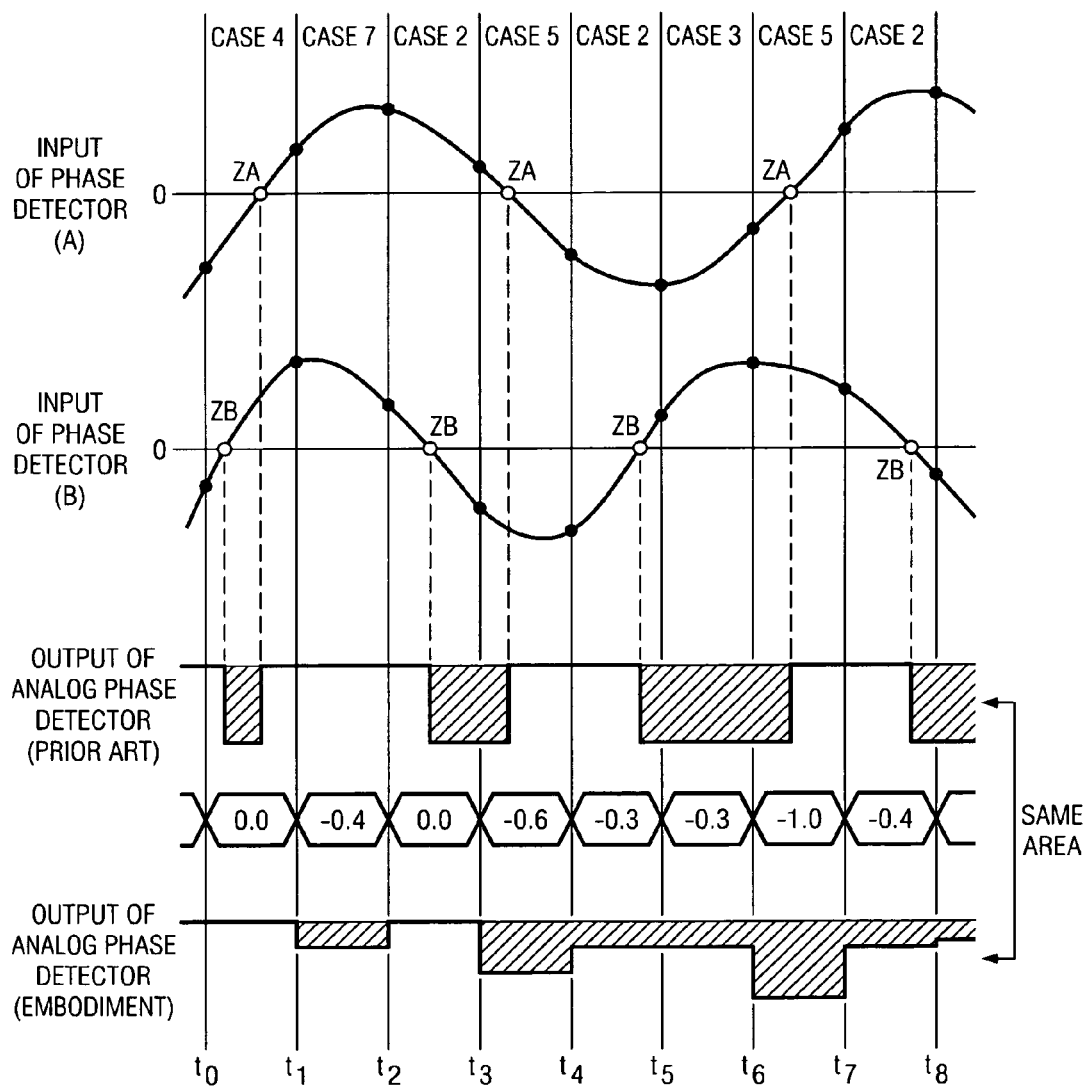
FIG. 17 is a waveform diagram illustrating the corresponding relationship between the analog signal process system of the prior art and the digital signal processing system of the embodiment.
Figure 21:
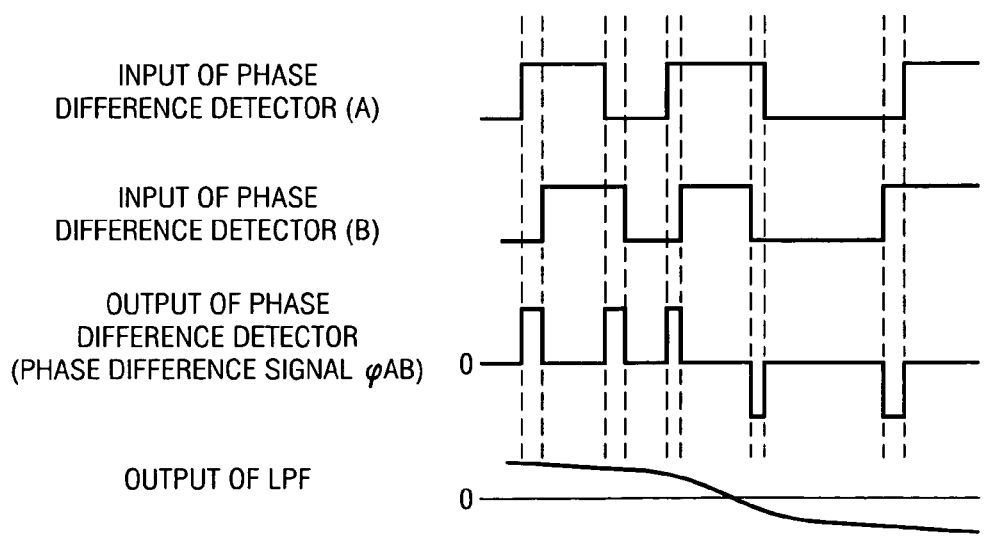
FIG. 21 is a waveform diagram illustrating the sign processing method of the tracking error signal of the prior art.

As explained above, for the operation output Q corresponding to each case, the period when the signs of the two RF signals A and B in the interval $(t_{n-1} \sim t_n)$ are different from each other in the first approximation of the two signals is represented by a digital value. It corresponds to the representation of the period when the two RF signals A and B are different from each other in the analog signal processing system of the prior art (FIG. 21) with the pulse width when the output of the phase difference detector has a logical value of "1". FIGS. 16 and 17 schematically illustrate waveforms for facilitating an understanding of the corresponding relationship.

FIG. 16 is a phase diagram illustrating the case in which RF signal A leads RF signal B. The first interval $(t_0-t_1)$ is the pattern of case (4), which corresponds to the operation formula (7). Its operation result Q4n (with value=0.4) is output from multiplexer (MUX) 78 during the next interval $(t_1 \sim t_2)$.

The second interval ($t_1$~$t_2$) is the pattern for case 7, which corresponds to the operation formula 10. Its operation result Q7n (value=0.0) is output from multiplexer (MUX) 78 during the next interval ($t_2$~$t_3$).

The third interval ($t_2$~$t_3$) is the pattern for case 1, which corresponds to the operation formula (4). Its operation result Q1n (value=0.6) is output from multiplexer (MUX) 78 during the next interval ($t_3$~$t_4$).

The fourth interval ($t_3$~$t_4$) is the pattern for case 6, which corresponds to the operation formula 9. Its operation result Q6n (value=0.3) is output from multiplexer (MUX) 78 during the next interval ($t_4$~$t_5$).

The fifth interval ($t_4$~$t_5$) is the pattern for case 1, which corresponds to the operation formula (4). Its operation result Q1n (value=0.3) is output from multiplexer (MUX) 78 during the next interval ($t_5$~$t_6$).

The sixth interval ($t_5$~$t_6$) is the pattern for case 3, which corresponds to the operation formula (6). Here, because the interval immediately preceding it is case 1, its operation result Q3n is given as Q3n=1, and it is output from multiplexer (MUX) 78 during the next interval ($t_6$~$t_7$).

The seventh interval ($t_6$~$t_7$) is the pattern for case 6, which corresponds to the operation formula 9. Its operation result Q6n (value=0.4) is output from multiplexer (MUX) 78 during the next interval ($t_7$~$t_8$).

In FIG. 16, the output of the phase difference detector obtained by the analog signal processing system of the prior art (FIG. 21) is also shown on the same time axis as a comparative example. In the prior art, the phase difference between the two RF signals A and B is represented by the pulse width of the pulses continuous in time. On the other hand, the points represented by the discrete digital values for each interval (sampling period) according to the invention are different from the prior art in that the timing of the phase difference output in the invention is delayed by 1 clock cycle, while the value obtained by integrating the output (area) of the phase difference detector (phase difference signal) is substantially the same or equivalent.

FIG. 17 is a phase diagram illustrating the case when RF signal A lags RF signal B. Except for the sign of the output of the phase difference detector, the operation is the same as that in the case shown in FIG. 16. As this can be seen from the graph, the detailed explanation is omitted.

In Embodiment 2 (FIG. 1), the phase difference detector 54 has the same arrangement as phase difference detector 52 (FIG. 4). The same digital processing as described above (FIGS. 5-17) is performed on the two RF signals C, D. Also, in principle, it is also possible to use only phase difference information ΦAB between two RF signals A and B or phase difference information ΦCD between two RF signals C and D as the tracking error information.

As explained above, according to the invention, it is possible to replace the zero crossing detector, made up of analog circuits, of the prior art with a digital circuit at an easily realizable speed (on the order of MHz), and the detection of the tracking error and the tracking servo operation can be performed with the same precision as in analog signal processing. In addition to the zero crossing detector most of the overall system (especially the equalizer and low-pass filter arranged in the first stage and second stage of the phase difference detector) can be replaced with digital circuits. As a result, it is possible to reduce the overall circuit scale of the system to a fraction of that of the prior art, so that a single-chip arrangement can be realized. In addition, since the circuit scale is reduced, the power consumption can be decreased, and at the same time, by using a digital system, it becomes easier to change the circuit design and reduce development time as semiconductor processing technology changes. This is an ancillary effect of the invention.

Figure 18:
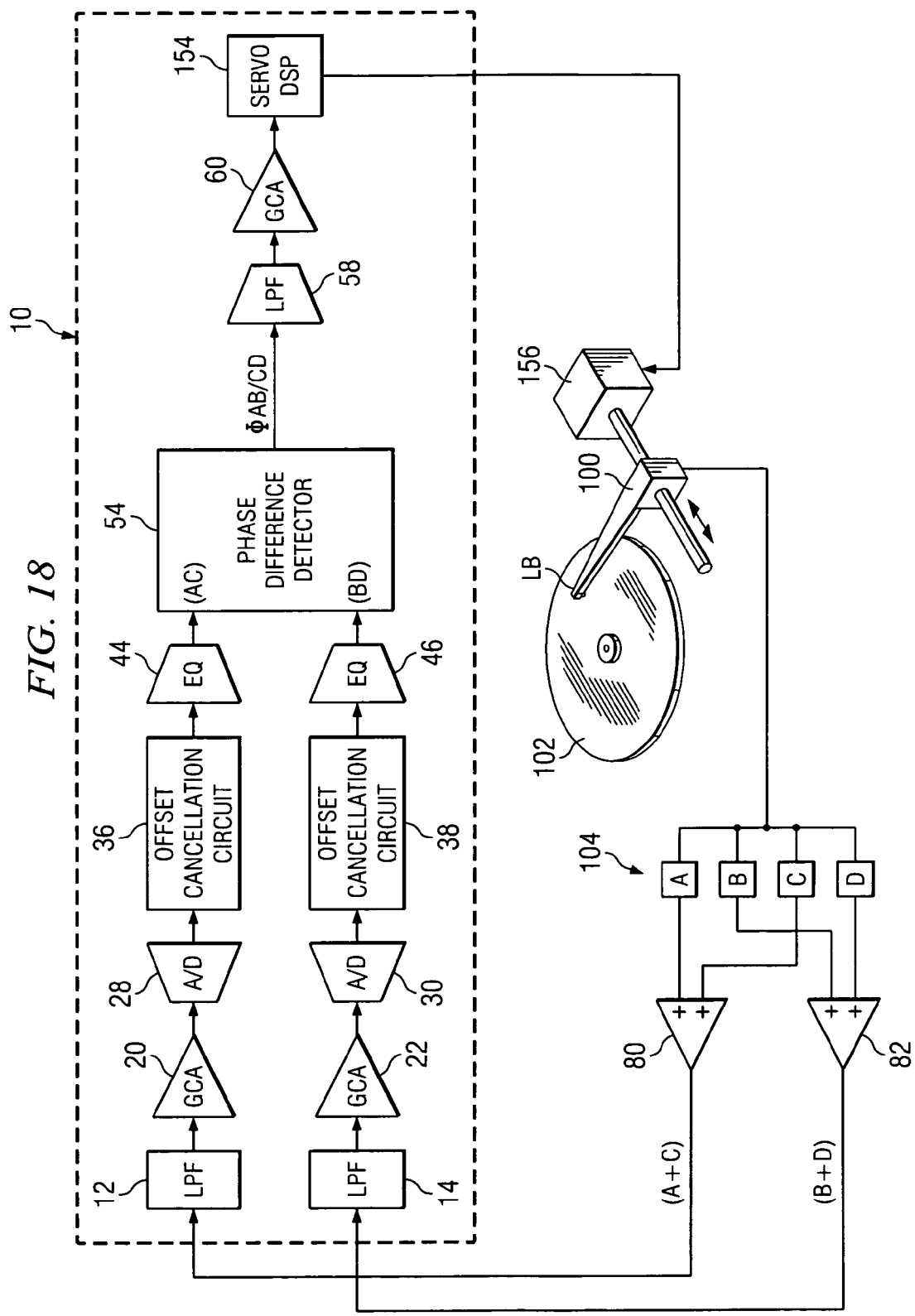
FIG. 18 is a block diagram illustrating the arrangement of the tracking servo mechanism in a variant embodiment.

The invention is not limited to the aforementioned embodiment. As long as the technical concept is observed, various modifications or changes can be made. For example, in order to determine the time of the zero crossing for each RF signal by interpolation, in the aforementioned embodiment, a first approximation formula (1) based on the two digital values ($A_{n-1}$, An) before and after a change of sign in the embodiment is used. However, it is also possible to use a second or third approximation formula on the basis of three digital values ($A_{n-2}$, $A_{n-1}$, $A_n$) or four digital values ($A_{n-2}$, $A_{n-1}$, $A_n$, $A_{N+1}$) before and after a change of sign. Also, it is possible to change the aforementioned embodiment corresponding to the variation of the DPD system. For example, as shown in FIG. 18, from RF signals A, B, C, D, by means of analog adders 80, 82, two summation signals (A+C), (B+D) are generated, and, for the two summation signals (A+C), (B+D), it is also possible to obtain synthetic tracking error signal ΦAB/CD from phase difference detector 52 using the same signal processors (12-54) as the single system of the embodiment (such as A, B system). Also, it is possible to use low-pass filters (LPF) (12-18) for anti-aliasing of the input portion, gain control amplifier (GCA) 20-26, A/D converters 28-34, and other circuits in other signal processing (such as focusing servo). The invention is not limited to DVDs; it may also be used in CDs (Compact Discs) and other optical disc devices.

Those skilled in the art to which the invention relates will appreciate that various additions, deletions, substitutions and other modifications may be made to the described example embodiments, without departing from the scope of the claimed invention.

The invention claimed is:

1. A tracking error detection method usable in a Differential Phase Detection (DPD) system of an optical disc device, the system comprising:

converting a first analog radio frequency (RF) signal, a second analog RF signal, a third analog RF signal, and fourth analog RF signal into a first digital signal, a second digital signal, a third digital signal, and a fourth digital signal, wherein a phase difference between the first and second analog RF signals varies corresponding to a tracking error from an optical pickup, and wherein a phase difference between the third and fourth analog RF signals varies corresponding to the tracking error from the optical pickup;

monitoring the sign of each digital value for each sampling interval for the first digital signal, the second digital signal, the third digital signal, and the fourth digital signal;

determining times for each zero crossing with a predetermined approximation formula when there is a change of sign between consecutive digital values for each of the first and second digital signals;

determining times for each zero crossing with the predetermined approximation formula when there is a change of sign between consecutive digital values for each of the third and fourth digital signals;

determining time differences between corresponding zero crossings of the first and second RF signals;

determining time differences between corresponding zero crossings of the third and fourth RF signals; and generating a synthetic digital tracking error signal based at least in part on the time differences between corresponding zero crossings of the first and second RF signals and the time differences between corresponding zero crossings of the third and fourth RF signals by:

generating a first digital tracking error signal at least in part from the time differences between corresponding zero crossings of the first and second RF signals;
generating a second digital tracking error signal at least in part from the time differences between corresponding zero crossings of the third and fourth RF signals; and
generating the synthetic tracking error signal at least in part from the first tracking error signal and the second tracking error signal.

2. A method as in claim 1, wherein the method further comprises controlling the position of the optical pickup in the radial direction of the optical disc corresponding to the tracking error signal.

3. A tracking error detection method usable in a DPD system of an optical disc device, the system comprising:
converting a first analog RF signal, a second analog RF signal, a third analog RF signal, and fourth analog RF signal into a first digital signal, a second digital signal, a third digital signal, and a fourth digital signal, wherein a phase difference between the first and second analog RF signals varies corresponding to a tracking error from an optical pickup, and wherein a phase difference between the third and fourth analog RF signals varies corresponding to the tracking error from the optical pickup;
monitoring the sign of each digital value for each sampling interval for the first digital signal, the second digital signal, the third digital signal, and the fourth digital signal;
determining times for each zero crossing with a predetermined approximation formula when there is a change of sign between consecutive digital values for each of the first and second digital signals;
determining times for each zero crossing with the predetermined approximation formula when there is a change of sign between consecutive digital values for each of the third and fourth digital signals;
determining time differences between corresponding zero crossings of the first and second RF signals;
determining time differences between corresponding zero crossings of the third and fourth RF signals;
generating a synthetic digital tracking error signal based at least in part on the time differences between corresponding zero crossings of the first and second RF signals and the time differences between corresponding zero crossings of the third and fourth RF signals;
filtering the synthetic tracking error signal to generate a filtered signal;
amplifying the filter signal to generate an amplified signal; and
processing the amplified signal to a control signal for an actuator.

4. A method comprising:
combining a first and a third analog RF signal to generate an first intermediate analog signal;
combining a second and a fourth analog RF signal to generate a second intermediate analog signal, wherein a phase difference between the first and second analog RF signals varies corresponding to a tracking error from an optical pickup, and wherein a phase difference between the third and fourth analog RF signals varies corresponding to the tracking error from the optical pickup;
converting the first intermediate analog and the second intermediate analog signals to a first digital signal and a second digital signal;
monitoring the sign of each digital value for each sampling interval for the first digital signal and the second digital signal;
determining times for each zero crossing with a predetermined approximation formula when there is a change of sign between consecutive digital values for each of the first and second digital signals;
determining time differences between corresponding zero crossings of the first and second intermediate analog signals;
generating a synthetic digital tracking error signal based at least in part on the time differences between corresponding zero crossings of the first and second intermediate analog signals;
filtering the synthetic tracking error signal to generate a filtered signal;
amplifying the filter signal to generate an amplified signal; and
processing the amplified signal to a control signal for an actuator.

5. A method as in claim 4 wherein the method further comprises controlling the position of the optical pickup in the radial direction of the optical disc corresponding to the tracking error signal.

6. An apparatus comprising:
a plurality of pairs of analog-to-digital converters (ADCs), wherein a first ADC of each pair receives a first analog RF signal and outputs a first digital signal, and wherein a second ADC of each pair receives a second analog RF signal and outputs a second digital signal, and wherein a phase difference between the first and second analog RF signals varies corresponding to a tracking error from an optical pickup;
a plurality of phase difference detectors, wherein each phase difference detector is coupled to at least one of the pairs of ADCs, and wherein each phase difference detector outputs a digital tracking error;
an adder that is coupled to each phase detector, wherein the adder output a synthetic digital error tracking signal;
a plurality of offset cancellation circuits, wherein each offset cancellation circuit is coupled to at least one of the ADCs; and
a plurality of equalizers, wherein each equalizer is coupled between at least one of the offset cancellation circuits and at least one of the phase difference detectors.

7. The apparatus as in claim 6, wherein the apparatus further comprises:
a filter that is coupled to the adder;
an amplifier that is coupled to the filter; and
a digital signals processor (DSP) that is coupled to the amplifier.

8. The apparatus as in claim 6, wherein each phase difference detector further comprises:
a first zero crossing detector that is coupled to one of the first ADCs of one of the pairs of ADCs;
a second zero crossing detector that is coupled to one of the second ADCs of one of the pairs of ADCs; and
a phase difference calculator that is coupled to each of the first zero crossing detector and the second zero crossing detector.

9. The apparatus as in claim 6, wherein each phase difference detector further comprises:
a first delay register that is coupled to one of the first ADCs of one of the pairs of ADCs;
a second delay register that is coupled to one of the second ADCs of one of the pairs of ADCs;
a phase difference calculator that is coupled to each of the first and second delay registers;
a multiplexer that is coupled to the phase difference calculator; and
a judgment circuit that is coupled to each of the first and second delay registers and to the multiplexer.

10. An apparatus comprising:
a first adder that receives a first analog RF signal and a third analog RF signal;
a second adder that receives a second analog RF signal and a fourth analog RF signal, wherein a phase difference between the first and second analog RF signals varies corresponding to a tracking error from an optical pickup, and wherein a phase difference between the third and fourth analog RF signals varies corresponding to the tracking error from the optical pickup;
a first ADC that is coupled to the first adder;
a second ADC that is coupled to the second adder;
a plurality of phase difference detectors, wherein each phase difference detector is coupled to one of the first and second ADCs, and wherein each phase difference detector outputs a synthetic digital tracking error;
a filter that is coupled to the phase difference detector;
an amplifier that is coupled to the filter; and
a DSP that is coupled to the amplifier.

11. The apparatus as in claim 10, wherein each phase difference detector further comprises:
a first zero crossing detector that is coupled to the first ADC;
a second zero crossing detector that is coupled to the second ADC; and
a phase difference calculator that is coupled to each of the first zero crossing detector and the second zero crossing detector.

12. The apparatus as in claim 10, wherein each phase difference detector further comprises:
a first delay register that is coupled to the first ADC;
a second delay register that is coupled to the second ADC;
a phase difference calculator that is coupled to each of the first and second delay registers;
a multiplexer that is coupled to the phase difference calculator; and
a judgment circuit that is coupled to each of the first and second delay registers and to the multiplexer.

13. The apparatus as in claim 10, wherein the apparatus further comprises:
a first filter that is coupled to the first adder;
a second filter that is coupled to the second adder;
a first amplifier that is coupled between the first filter and the first ADC; and
a second amplifier that is coupled between the second filter and the second ADC.

* * * * *